(12) United States Patent
Tsurumaki et al.

(10) Patent No.: US 6,598,117 B2
(45) Date of Patent: Jul. 22, 2003

(54) RECORDING MEDIUM LIBRARY DEVICE AND CONTROL METHOD THEREOF

(75) Inventors: Nobuhiro Tsurumaki, Kanagawa (JP); Keiji Tadokoro, Kanagawa (JP); Masato Yokota, Kanagawa (JP); Toru Yumine, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/075,697

(22) Filed: Feb. 14, 2002

(65) Prior Publication Data

US 2002/0073275 A1 Jun. 13, 2002

Related U.S. Application Data

(62) Division of application No. 09/458,380, filed on Dec. 10, 1999, now Pat. No. 6,507,889, which is a continuation of application No. PCT/JP99/01877, filed on Apr. 8, 1999.

(30) Foreign Application Priority Data

Apr. 10, 1998 (JP) .............................. 10-98679
Apr. 10, 1998 (JP) .............................. 10-98682
Apr. 10, 1998 (JP) .............................. 10-98683

(51) Int. Cl.$^7$ .............................. G11B 3/58; G06P 12/00
(52) U.S. Cl. .................. 711/114; 711/111; 711/115; 711/154; 711/156; 369/71; 369/72; 369/73; 369/74
(58) Field of Search .................. 711/111, 112, 115, 711/154, 156; 369/71–74

(56) References Cited

U.S. PATENT DOCUMENTS

| | | | | |
|---|---|---|---|---|
| 5,381,292 A | * | 1/1995 | Richmond | 360/128 |
| 5,642,337 A | | 6/1997 | Oskay et al. | 369/30 |
| 5,684,766 A | * | 11/1997 | Inoue et al. | 369/30.5 |
| 5,949,629 A | * | 9/1999 | Suzuki et al. | 360/128 |
| 6,188,534 B1 | * | 2/2001 | Sakui | 360/128 |
| 6,252,739 B1 | * | 6/2001 | Todd et al. | 360/128 |
| 6,359,751 B1 | * | 3/2002 | Groel et al. | 360/128 |

FOREIGN PATENT DOCUMENTS

| | | |
|---|---|---|
| EP | 0 537 357 | 4/1993 |
| JP | 62-259257 | 11/1987 |
| JP | 63-229677 | 9/1988 |
| JP | 1-159819 | 6/1989 |
| JP | 7-44829 | 2/1995 |
| WO | WO 94 08337 | 4/1994 |

OTHER PUBLICATIONS

Patent Abstracts of Japan vol. 013, No. 032 (P–817), Jan. 25, 1989 & JP 63 229677 A (Mitsubishi Electric Corp), Sep. 26, 1988.
Patent Abstracts of Japan, vol. 017, No. 132 (P–1504), Mar. 18, 1993 & JP 04 310667 A (Fujitsu Ltd), Nov. 2, 1992.
Patent Abstracts of Japan, vol. 018, No. 235 (P–1732), Apr. 28, 1994 & JP 06–020234 A (Victor Co. of Japan Ltd.), Jan. 28, 1994.
Patent Abstracts of Japan, vol. 1996, No. 06, Jun. 28, 1996 & JP 08 030934 A (PFU LTD), Feb. 2, 1996.

* cited by examiner

Primary Examiner—T. V. Nguyen
(74) Attorney, Agent, or Firm—Frommer Lawrence & Haug LLP; William S. Frommer; Bruno Polito

(57) ABSTRACT

A cassette library (1) is provided with a driving apparatus (13), cassette housing shelves (14, 15) and a cassette carrier (16). A library controller (2) simulates as if driving apparatuses (13) having continuous address numbers were apparently used in the host computer (3) even when physically discontinuous address numbers are allocated to the driving apparatus (13), thereby making it possible to set occupancy for a driving apparatus with an arbitrary address number. The library controller (2) has the cassette carrier (16) automatically carry, at a preset timing, a cleaning cassette from the cassette housing shelf (14, 15) to the driving apparatus (13) to clean a recording reproduction head of the driving apparatus (13) using the cleaning cassette which is then carried back to the housing section in the original cassette housing shelf (14, 15) after the cleaning work.

6 Claims, 15 Drawing Sheets

FIG.12A Basic table

| Internal BIN head No. |
| Internal BIN end No. |
| INPORT head No. |
| INPORT end No. |
| Drive head No. |
| Drive end No. |
| Continuation present/absent |

FIG.12B Extension table

| Drive head No. |
| Drive end No. |
| Continuation present/absent |

| Physical address number (allocated host name) | Logical address number for host |
|---|---|
| 1  (host 3a) | 1001 |
| 2  (host 3a) | 1002 |
| 3  (host 3b) | 1003 |
| 4  (host 3b) | 1004 |
| 5  (host 3a) | 1005 |
| 6  (host 3a) | 1006 |
| 7  (host 3b) | 1007 |
| 8  (host 3b) | 1008 |

FIG.13

RECORDING MEDIUM LIBRARY DEVICE AND CONTROL METHOD THEREOF

This is a divisional of application Ser. No. 09/458,380 now U.S. Pat. No. 6,507,889 filed Dec. 10, 1999 which is a continuation of PCT/JP99/01877 filed Apr. 8, 1999.

TECHNICAL FIELD

The present invention relates to a recording medium library device which houses a plurality of recording media loadable/unloadable to/from a recording and reproducing apparatus, such as cassette tapes, and is capable of recording/reproducing various information to/from the housed recording medium as necessary. The present invention also relates to methods of setting occupancy, determining and notifying completion of loading a recording medium, and cleaning for such a recording medium library device.

BACKGROUND ART

There has long been a system which houses a plurality of recording media (cassette tapes or disk-shaped recording media, for example) loadable/unloadable to/from a recording and reproducing apparatus and records various information onto the housed recording media and reproduces the recorded information as necessary. Such a system is called a library system, auto-changer, or the like. In the following description, it will be called a library system.

Some library systems have predetermined compositions. Other library systems have compositions which can be adapted to a certain degree to suit the user. An example of the latter library systems has a plurality of consoles. The consoles are combined freely to form library systems of various sizes and arrangements. Examples of the consoles are a drive console and a console for housing recording media. A drive console has a recording and reproducing apparatus which records and reproduces information onto/from a recording medium. A console for housing recording media has a plurality of housing sections, each capable of housing a recording medium. Some consoles for recording and reproduction further comprise a plurality of housing sections, each capable of housing a recording medium. Moreover, the latter library system comprises a carrier apparatus and a control unit. The carrier apparatus carries a recording medium between any one of the housing sections and the recording and reproducing apparatus. The control unit controls the recording and reproducing apparatus and the carrier apparatus.

In the library system, under the control of the control unit, the carrying apparatus is controlled to carry a recording medium between any one of the housing sections and the recording and reproducing apparatus. Various information is recorded on the recording medium carried to the recording and reproducing apparatus, and the recorded information is reproduced.

Such a library system has some problems as described hereinbelow.

The first problem is as follows.

Some library systems are connected to one or more host computers serving as client(s) so that the host computer can use the library systems. In this case, a library system is connected to the host computer by, for example, a transmission line of the standard for jukebox in the SCSI (Small Computer System Interface) standard established by ANSI (American National Standards Institute).

In cases, as for example where one library system is shared by a plurality of host computers, a control unit of the library system may set occupancy of a plurality of recording and reproducing apparatuses, housing sections and the like for each host computer as a client. The occupancy is set through giving continuous address numbers to the recording and reproducing apparatuses and allocating the address numbers to each host computer. By the operation, each host computer can use only the occupied recording and reproducing apparatus and the like. At this time, it is necessary to allocate continuous address numbers to one host computer because of the standard of the transmission line used to connect the host computer to the library system.

Conventionally, the only method of setting occupancy is therefore to allocate physically continuous recording and reproducing apparatuses or the like to one host computer. An arbitrary address number cannot be allocated to one host computer. This results in a problem of the low degree of freedom in setting occupancy. For example, when one of the physically continuous recording and reproducing apparatuses fails, the address numbers are interrupted. This causes a problem that, in the host computer occupying the failed recording and reproducing apparatus, a process of changing the occupancy setting so as to occupy a recording and reproducing apparatus for replacement cannot be performed.

The second problem is as follows.

In a library system having the composition as mentioned above, when a recording medium is carried by the carrying apparatus from the console for housing recording media and loaded to the recording and reproducing apparatus, the recording and reproducing apparatus performs a preparing operation for reading predetermined retrieval information from the loaded recording medium. The retrieval information, which is read by the preparing operation, includes information on, for example, an address on the recording medium of data recorded on the recording medium. By reading the retrieval information in advance, the processing speed with which data on the recording medium is accessed in response to a reproduction request from an upper control computer can be increased. This speed-up contributes to the improvement of the processing efficiency of the library system as a whole.

In this case, after the preparing operation is finished, the recording and reproducing apparatus notifies the upper control computer of completion of carriage of the recording medium. When the upper control computer receives the notification, the upper control computer issues the next recording medium carrying command to the library system.

The preparing operation requires, however, a relatively long time of 30 seconds to one minute. During the period, the upper control computer remains waiting for the notification from the recording and reproducing apparatus of completion of carriage of the recording medium. The carrying apparatus of the library system therefore also remains waiting. This waiting period becomes a useless time, causing a problem of deterioration in the processing efficiency of the library system as a whole.

The third problem is as follows.

In a library system having the above-described composition, a number of recording media are used. In order to maintain always the high recording and reproduction quality, it is necessary to clean the recording and reproducing head of the recording and reproducing apparatus periodically or as necessary. Conventionally, a cleaning medium is housed in part of the console for housing recording media. With manual operation by the user, periodically or as necessary, the cleaning medium is carried from the console for housing recording media to each recording and reproducing apparatus to clean the head.

As described above, cleaning the head of the recording and reproducing apparatus by manual operation is time-consuming. Also, it is not easy to manage timely head cleaning of each recording and reproducing apparatus without missing the timing of head cleaning. As a result, the operating cost of the system is high and it is difficult to properly control the system operation. A possible way to deal with the problem is to perform automatically and periodically the head cleaning process of each recording and reproducing apparatus by using a cleaning medium housed in the console for housing recording media.

When the recording medium used in the library system as described above is in a tape form such as a video cassette tape, the cleaning medium used for cleaning the recording and reproducing apparatus is also in a tape form. That is, a cleaning cassette is used. Some cleaning cassettes cannot be rewound and used repeatedly and are to be disposed when the tape is used up. In order to ensure cleaning by using such a cleaning cassette, it is indispensable that a usable tape area is left in the cleaning cassette.

In cases where head cleaning is performed by manual operation, it is possible to keep track of the amount of the usable tape area of the cleaning cassette accurately by checking the number of times each cleaning cassette is used. If the number of times a cleaning cassette is used reaches a specified number, the cleaning cassette can be taken out from the cassette housing shelf and disposed.

On the other hand, in the cases of automatic head cleaning as mentioned above, the user can no longer keep track of the number of times a cleaning cassette is used. Consequently, a cleaning cassette whose tape has been ended or a cleaning tape having an insufficient remaining amount may be used for the head cleaning process. It is also expected that the head cleaning is not performed at all or not performed sufficiently in practice. In order to prevent this, with each head cleaning process, the user has to unload the cleaning cassette used for the head cleaning from a cassette housing shelf, visually check the remaining amount of the tape, and determine whether the head cleaning has been performed properly or failed since the tape is ended. This makes the automatization of the head cleaning process meaningless.

DISCLOSURE OF INVENTION

The invention has been achieved in consideration of the above problems. It is an object of the invention to provide a recording medium library device capable of freely setting occupancy for a client and a method of setting occupancy.

Another object of the invention is to provide a recording medium library device capable of improving the efficiency of the whole system by eliminating useless waiting time related to carriage of a recording medium, and a method for determining completion of loading a recording medium, and a method for notifying completion of loading a recording medium.

Still another object of the invention is to provide a recording medium library device which enables proper management of use of a cleaning medium housed in a console for housing a recording medium so as to ensure cleaning, and to provide a cleaning method.

A recording medium library device according to the invention comprises: one or more recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; and control means for controlling the carrying means and the recording and reproducing means in response to a request from a client, wherein the control means has a function of setting a part to be occupied for one or more clients and a function of converting between a physical address and a logical address managed by the client, with respect to a part to be occupied. In the recording medium library device, conversion between a physical address and a logical address managed by a client is performed and a part to be occupied is set for one or more client(s) by the control means.

An occupancy setting method according to the invention is a method of setting a part to be occupied for each client in a recording medium library device which comprises: one or more recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; and control means for controlling the carrying means and the recording and reproducing means in response to a request from a client, wherein the control means sets a part to be occupied for one or more client(s) and converts between a physical address and a logical address managed by the client, with respect to a part to be occupied. In the occupancy setting method for the recording medium library device, in the control means, conversion between a physical address and a logical address managed by the client is performed and a part to be occupied is set for one or more client(s).

Another recording medium library device according to the invention comprises: recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; detecting means for detecting carriage of the recording medium by the carrying means to the recording and reproducing means; and control means for controlling the carrying means and the recording and reproducing means, the control means having the function of sending a request to load the recording medium housed in the housing section in the recording medium housing means into the recording and reproducing means to the carrying means, and when the detecting means detects the carriage of the recording medium to the recording and reproducing means, determining that the loading of the recording medium has been completed, without waiting for completion of a preparing operation in the recording and reproducing means after the recording medium has been loaded. The control means can be constructed to send a request to load the recording medium housed in the housing section in the recording medium housing means into the recording and reproducing means in response to a request from the client and, when it is determined that the loading of the recording medium into the recording and reproducing means has been completed, to send a notification of the recording media loading completion to the client.

According to the invention, there is provided a method of determining completion of loading of a recording medium in a recording medium library device which comprises: recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; detecting means for detecting carriage of the recording medium by the carrying means to the recording and reproducing means; and control means for controlling the carrying means and the recording and reproducing means, wherein the control means sends to the carrying means a request to load the recording medium housed in the housing section in the recording medium housing means to the recording and reproducing means and, when the detecting means detects the carriage of the recording medium to the recording and reproducing means, determines that the loading of the recording medium has been completed, without waiting for completion of a preparing operation in the recording and reproducing means after the recording medium has been loaded.

According to the invention, there is provided a method of notifying a client of completion of loading of a recording medium in a recording medium library device which comprises: recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; detecting means for detecting carriage of the recording medium to the recording and reproducing means; and control means for controlling the carrying means and the recording and reproducing means in response to a request from a client, wherein in the control means, when a request to load the recording medium housed in the housing section in the recording medium housing means into the recording and reproducing means is received from the client and the carriage of the recording medium is detected by the detecting means, it is determined that the loading of the recording medium has been completed, without waiting for completion of the preparing operation in the recording and reproducing means after the recording medium is loaded and the completion of loading of the recording medium is notified to the client.

In the recording medium library device or the method of determining completion of loading of a recording medium for the device of the invention, the request to load the recording medium housed in the housing section in the recording medium housing means to the recording and reproducing means is sent to the carrying means. When the carriage of the recording medium to the recording and reproducing medium is detected by the detecting means, it is determined that the loading of the recording medium has been completed, without waiting for completion of the preparing operation to be executed by the recording and reproducing means after the recording medium is loaded.

In a method of notifying completion of loading of a recording media for a recording medium library device according to the invention, in response to a request from the client, a request to load the recording medium housed in the housing section in the recording medium housing means to the recording and reproducing means is sent to the carrying means. When the carriage of the recording medium to the recording and reproducing means is detected by the detecting means, it is determined that the loading of the recording medium has been completed, without waiting for completion of the preparing operation to be executed by the recording and reproducing means after the recording medium is loaded, and the client is notified of the completion of loading of the recording medium.

Still another recording medium library device of the invention comprises: recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; and control means for controlling the carrying means and the recording and reproducing means, wherein the control means has an automatic cleaning function of controlling the carrying means and the recording and reproducing means to automatically carry, at a preset timing, a cleaning medium used for cleaning the recording and reproducing means from the housing section in the recording medium housing means to the recording and reproducing means, to allow the cleaning medium to clean the recording and reproducing means, and then to carry the cleaning medium to the housing section in the recording medium housing means, and a function of monitoring a state of use of the cleaning medium and determining whether the cleaning medium has been used to its limit or not. When the number of times the cleaning medium is used reaches a predetermined number or when there is no usable area of the cleaning medium, the control means can determine that the cleaning medium has been used to its limit. In addition to the above configuration, the recording medium library device can further comprise an ejecting unit for ejecting the recording medium and the cleaning medium to the outside, and the cleaning medium can be carried to the ejecting unit when it is determined that the cleaning medium has been used to its limit. The control means may be also configured to output information to eject the cleaning medium when it is determined that the cleaning medium has been used to its limit.

According to a cleaning method of a recording medium library device of the invention comprising: recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; and control means for controlling the carrying means and the recording and reproducing means, the control means controls the carrying means and the recording and reproducing means to automatically carry, at a preset timing, a cleaning medium used for cleaning the recording and reproducing means from the housing section in the recording medium housing means to the recording and reproducing means, to allow the cleaning medium to clean the recording and reproducing means, after that, to carry the cleaning medium to the housing section in the recording medium housing means, while monitoring the state of use of the cleaning medium and determining whether the cleaning medium has been used to its limit or not.

In still another recording medium library device or a cleaning method thereof according to the invention, the cleaning medium is automatically carried from the housing section in the recording medium housing means to the recording and reproducing means at a preset timing. The recording and reproducing means is cleaned by the cleaning medium. After that, the cleaning medium is carried to the housing section in the recording medium housing means. The state of use of the cleaning medium is monitored and it is determined whether the cleaning medium has been used to its limit or not.

Other objects, features and advantages of the invention will appear more fully from the following description.

BRIEF DESCRIPTION OF DRAWINGS

FIGS. 12A and 12B are explanatory diagrams showing tables used for setting occupancy in the library controller illustrated in FIG. 1.

FIG. 13 is an explanatory diagram showing a conversion table used for setting occupancy in the library controller illustrated in FIG. 1.

BEST MODE FOR CARRYING OUT THE INVENTION

Embodiments of the invention will be described in detail hereinbelow with reference to the drawings.

Figure 1:
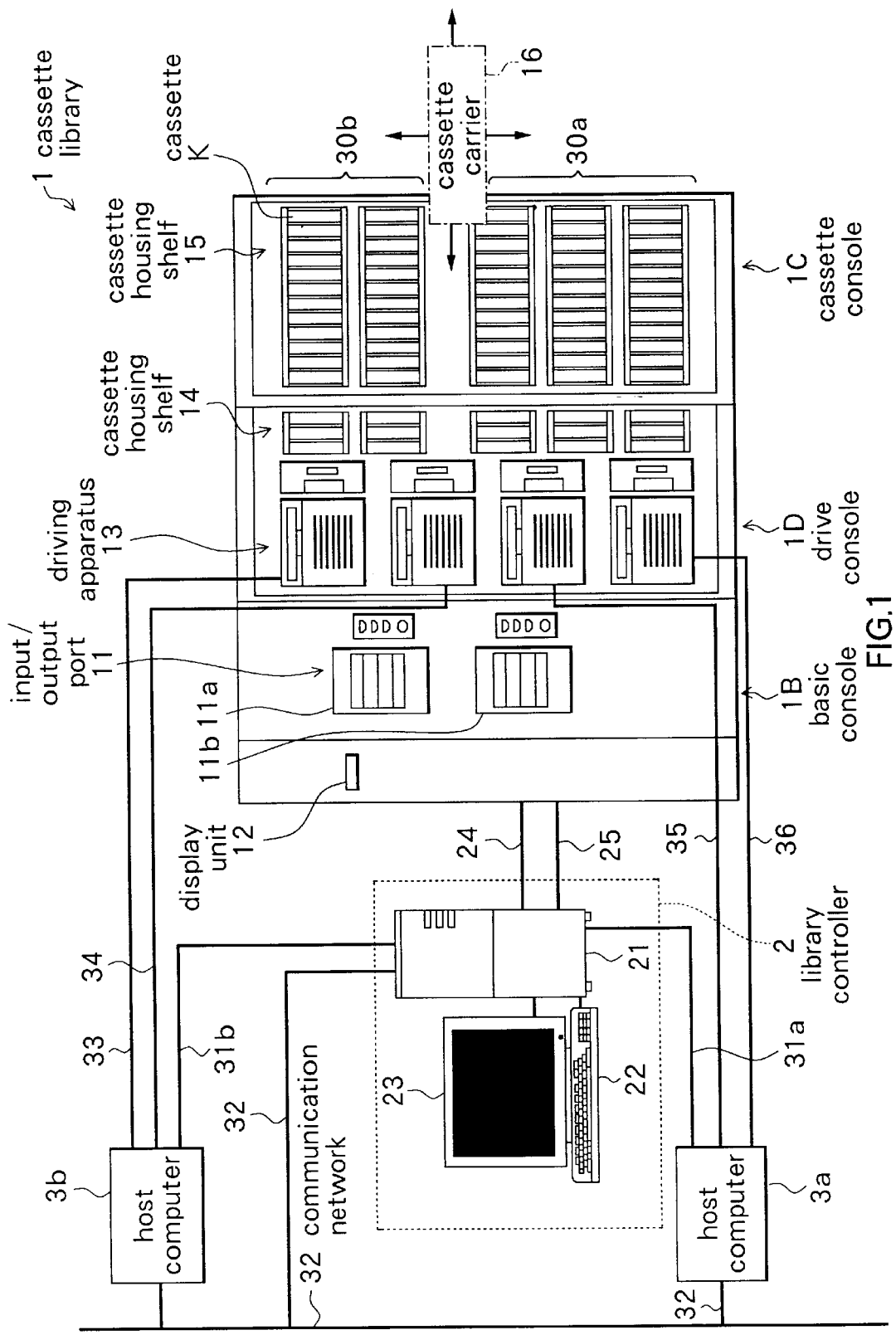
FIG. 1 is a front view showing a basic composition of a library system according to an embodiment of the invention.
Figure 2:
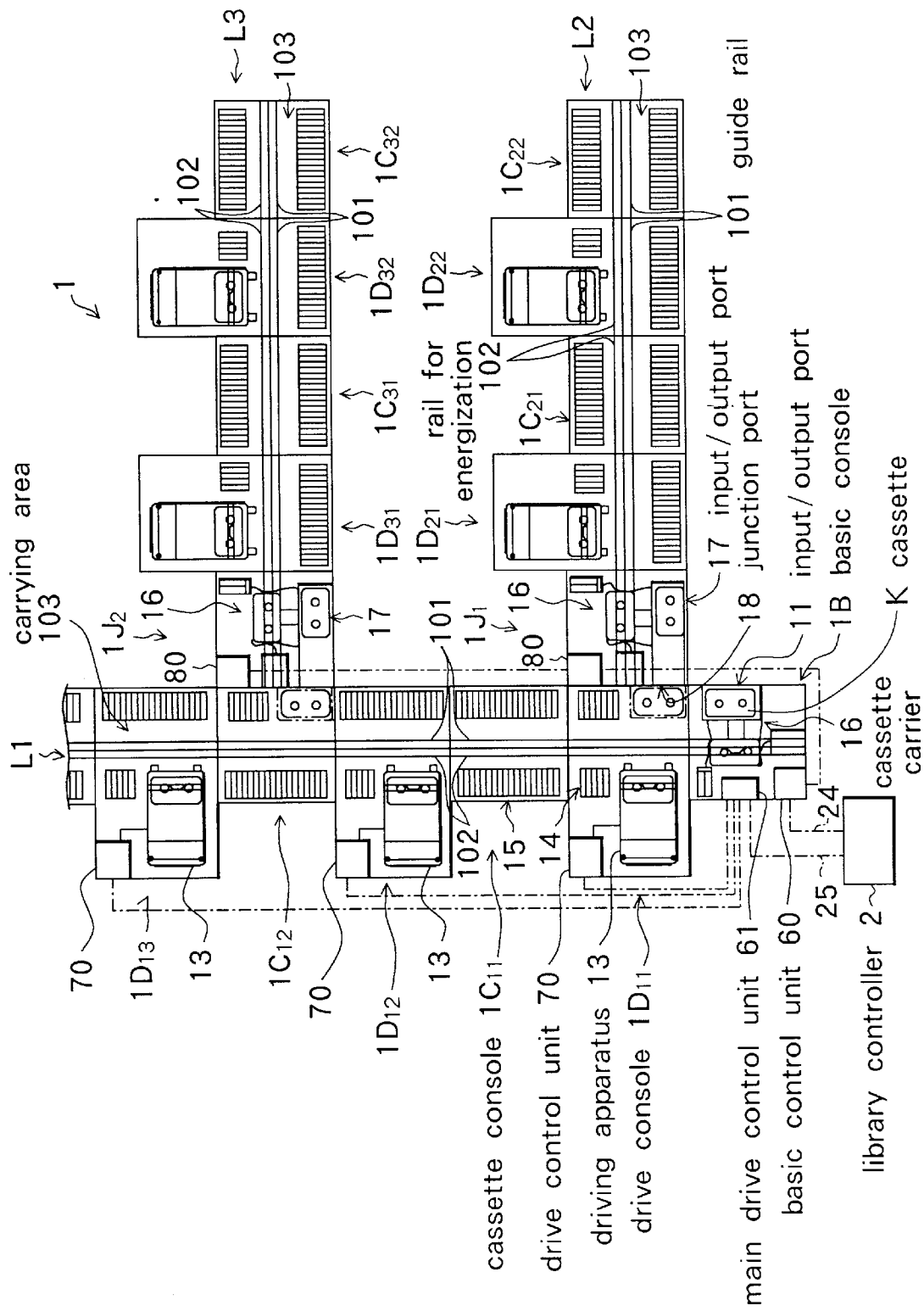
FIG. 2 is a plan view showing an example of an overall composition of a cassette library illustrated in FIG. 1.

FIGS. 1 and 2 are schematic illustrations of a library system as a recording medium library apparatus according to an embodiment of the invention. FIG. 1 is a front view of a basic composition of a library system according to the embodiment. FIG. 2 is a plan view showing an overall composition of a cassette library 1 illustrated in FIG. 1.

The library system according to the embodiment comprises the cassette library 1 and a library controller 2 as control means for controlling the cassette library 1. The cassette library 1 houses a plurality of video tape cassettes (hereinbelow, simply referred to as cassettes) K as recording media, and records and reproduces information on demand by using any one of the cassettes K housed therein.

The library controller 2 comprises: a controller body 21 as an apparatus for controlling the cassette library 1; an input device 22 including a mouse or a keyboard for inputting information necessary for control, giving instructions or other requests to the controller body 21; and a display device 23 connected to the controller body 21 and having a display screen for displaying information or other various messages associated with the control. The controller body 21 is connected to the cassette library 1 by transmission lines 24 and 25 of, for example, the RS-232C standard. The controller body 21 can be connected to a plurality of host computers 3a and 3b as clients who use the cassette library 1, by transmission lines 31a and 31b of, for example, the standard for jukebox in the SCSI (Small Computer System Interface) standard. The controller body 21 can be also connected to the host computers 3a and 3b via a communication network 32 of a predetermined standard such as Ethernet.

The host computer 3a is, for example, used as a client which occupies a predetermined occupancy area in the cassette library 1, such as the lower-half area 30a of the cassette library 1, and uses the area as a main server for recording and reproducing data. The host computer 3b is employed as a client which occupies a predetermined occupancy area, such as the upper-half area 30b of the cassette library 1, and uses the area for backup of data. Setting occupancy for determining which area in the cassette library 1 is occupied by the host computers 3a and 3b is performed by the library controller 2.

The cassette library 1 comprises four kinds of consoles, namely, a basic console 1B, a drive console 1D, a cassette console 1C and a junction console 1J. The cassette library 1 also comprises a cassette carrier 16 as carrying means for carrying a cassette K in the cassette library 1. The four kinds of consoles are selectively connected to one another so as to be able to change the position thereof. The cassette library 1 can have various library compositions, comprising part or all of the four kinds of consoles. A minimum of components of the cassette library 1 necessary to realize the library system are the basic console 1B and the drive console 1D.

FIG. 1 shows only an example of basic compositions of the cassette library 1. As shown in FIG. 1, one side face of the drive console 1D is connected to one side face of the basic console 1B and one side face of the cassette console 1C is connected to another side face of the drive console 1D. The cassette library shown in FIG. 2 comprises a console line L1 as a base, and console lines L2 and L3. The console line L1 comprises alternate drive consoles 1D ($1D_{11}$, $1D_{12}$, . . . ) and cassette consoles 1C ($1C_{11}$, $1C_{12}$, . . . ) connected with each other in a line extending from one side face of the basic console 1B in the order named. The console line L2 comprises alternate drive consoles 1D ($1D_{21}$, $1D_{22}$, . . . ) and cassette consoles 1C ($1C_{21}$, $1C_{22}$, . . . ) connected with each other in a line extending from the front face of the drive console $1D_{11}$ with a junction console $1J_1$ connected in between. The console line L3 comprises alternate drive consoles 1D ($1D_{31}$, $1D_{32}$, . . . ) and cassette consoles 1C ($1C_{31}$, $1C_{32}$, . . . ) connected with each other in a line extending from the front face of the cassette console $1C_{12}$ with a junction console $1J_2$ connected in between. As shown in FIG. 2, in the case in which there are provided a plurality of console lines, each of the console lines is mounted with an associated cassette carrier 16. The cassette K is transferred between two console lines via a junction port 18 in the junction console 1J.

The connection between the consoles is not limited to that shown in FIGS. 1 and 2. For example, even a cassette library with the composition in which only the basic console 1B and the drive console 1D are connected can perform basic functions of a library system.

In the cassette library 1, the drive console 1D has one or a plurality of driving apparatuses 13 and a cassette housing shelf 14. The driving apparatuses 13 work as recording and reproducing means (for example, VCR) for recording and reproducing information to/from the cassette K. It is sufficient for the drive console 1D to have at least the driving apparatus 13 and it is not always necessary for the drive console 1D to have the cassette housing shelf 14. The drive console 1D also has a drive control unit 70 (see FIG. 2) for controlling the driving apparatuses 13. The data to be recorded on the cassette K in the driving apparatus 13 is, for example, data supplied from a video editing apparatus (not shown) formed by RAID (Redundant Array of Inexpensive Disks), a semiconductor memory, and the like. Further, data reproduced from the driving apparatus 13 is supplied to the video editing apparatus. The driving apparatus 13 has a mechanism (not shown) for detecting whether the tape of the loaded cassette K or a cleaning cassette KC, which will be described hereinlater, is ended or not. The mechanism can be realized by a method of making the transmittance of the end part of the tape higher than that of the other part and detecting the end part by a photosensor of transmittance mode or a method of making the reflectance of the end part of the tape higher than that of the other part and detecting the end part by a photosensor of reflectance mode. In the description given hereinbelow, the cassette K includes the cleaning cassette KC unless otherwise described. The cassette console 1C has a cassette housing shelf 15 which has a plurality of housing sections and can house a plurality of cassettes K. The cassette housing shelves 14 and 15 are partially detached so that the cassette K can be received/transferred from/to the junction console 1J when the junction console 1J is connected to the drive console 1D and the cassette console 1C.

In a predetermined section of the cassette housing shelf 14, one or a plurality of cleaning cassette(s) KC (not shown) used to clean the recording and reproduction head (not shown) of the driving apparatus 13 is/are housed. The position where the cleaning cassette KC is housed is captured by the library controller 2. Specifically, as will be described hereinlater, address information on the position where the cleaning cassette is housed is stored in the system information file in a hard disk of a hard disk drive 49 in the library controller 2. In the embodiment, it is assumed that the cleaning cassette KC cannot be rewound and repeatedly used and is to be disposed when the tape is used up.

The driving apparatuses 13 of the drive console 1D can be connected to, for example, the host computer 3a by transmission lines 33 and 34 of the SCSI standard. The driving apparatuses 13 can be connected to, for example, the host computer 3b by transmission lines 35 and 36 of the SCSI standard. Only one of the host computers 3a and 3b can be connected to a single driving apparatus 13. For example, information to be recorded to the cassette K is transmitted to the driving apparatus 13 from the host computers 3a and 3b, which are connected to the driving apparatus 13 by the transmission lines 35 and 36. Conversely, information read out by the driving apparatus 13 is transmitted to the host computers 3a and 3b via the transmission lines 35 and 36. Setting occupancy by determining which of the driving apparatuses 13 is occupied by the host computers 3a and 3b is executed by the library controller 2.

The basic console 1B comprises an input/output port 11 and a display unit 12. The input/output port 11 imports the cassette K from the front face thereof into the library and automatically exports the cassette K in the library to the outside. The display unit 12 is provided on the front face of the basic console 1B and displays various information such as control information regarding the cassette library 1. The basic console 1B also has a bar code reading apparatus (not shown) for reading bar code information on 1D (identification information) given to the imported cassette K. The input/output port 11 is comprised of an upper port 11a provided on the upper stage of the basic console 1B and a lower port 11b provided on the lower stage. The upper and lower ports 11a and 11b are provided for the purposes of loading and ejecting the cassette K, each having a plurality of (for instance, four) input/output ports. The display unit 12 takes the form of, for instance, a liquid crystal display device. The basic console 1B further comprises a basic control unit 60 (see FIG. 2) and a main drive control unit 61 (see FIG. 2). The basic control unit 60 is connected to the controller body 21 of the library controller 2 by the transmission line 24. The main drive control unit 61 is connected to the drive control unit 70. The main drive control unit 61 is also connected to the controller body 21 by the transmission line 25.

The junction console 1J is used to extend the connection between the consoles, one side face thereof being connectable to the front face or rear face of another console. As shown in FIG. 2, on one side face of the junction console 1J, provided is a junction port 18 having the mechanism of transferring the cassette K to/from other consoles connected. The junction port 18 occupies a position opposite to the upper port 11a in the basic console 1B. On the front face of the junction console 1J, provided is an input/output port 17 having the function similar to that of the input/output port 11 of the basic console 1B. The input/output port 17 takes up a position opposite to the lower port 11b in the basic console 1B. The junction console 1J also has a basic control unit 80 for controlling the mechanism of transferring the cassette K in the junction port 18 and controlling the cassette carrier 16 or other components in an extended console line. The basic control unit 80 is electrically connected to the basic control unit 60 in the basic console 1B. Otherwise, the basic composition of the junction console 1J is similar to that of the basic console 1B.

In the center part of each of the basic console 1B, drive console 1D, cassette console 1C and junction console 1J, as shown in FIG. 2, provided is a carrying area 103 as a space for travel of the cassette carrier 16. In the carrying area 103, a guide rail 101 as a carriage path for travel of the cassette carrier 16 is laid in the direction in which the cassette carrier 16 is carried. Further, on a side of the guide rail 101, provided is a rail 102 for energization for supplying the cassette carrier 16 with power.

The cassette carrier 16 is capable of horizontal movements, in the carrying area 103, along the guide rail 101 while holding the cassette K, with power supplied by the rail 102 for energization. The cassette carrier 16 is also capable of vertical (up-and-down) movements in the consoles by a vertical movement mechanism (not shown) while holding the cassette K. Moreover, the cassette carrier 16 has a mechanism of transferring the cassette K to/from each console. For example, the cassette carrier 16 can carry the cassette K imported via the input/output port 11 in the basic console 1B for delivery to the cassette housing shelf 15 in the cassette console 1C.

Figure 3:
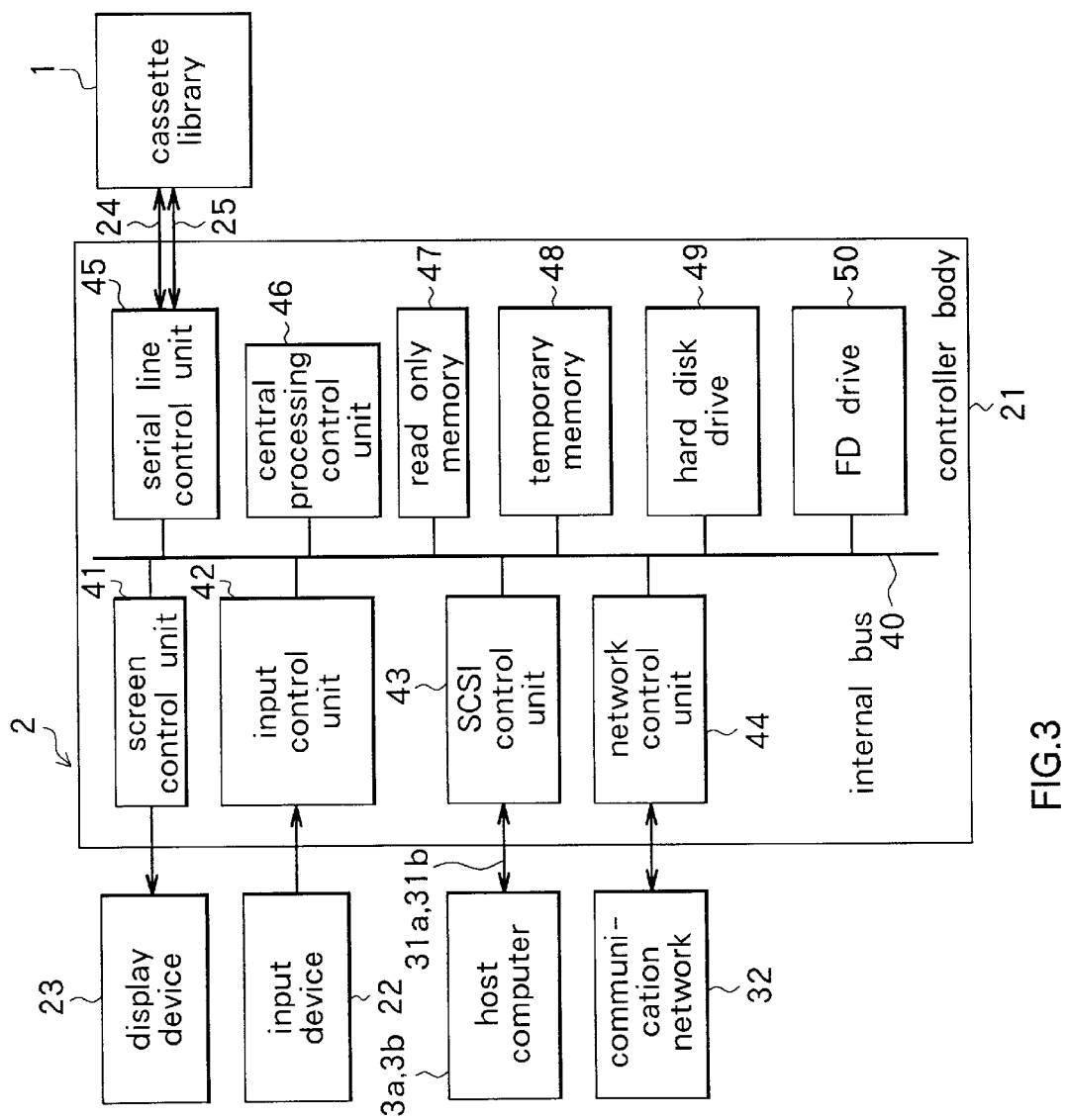
FIG. 3 is a block diagram showing a circuit composition of a library controller illustrated in FIG. 1.

FIG. 3 is a block diagram showing the circuit composition of the library controller 2. The controller body 21 of the library controller 2 comprises a screen control unit 41 for controlling the display device 23, an input control unit 42 for controlling the input device 22, an SCSI control unit 43 for executing control to connect the host computers 3a and 3b to the library controller 2 in the SCSI standard by the transmission lines 31a and 31b, and a network control unit 44 for performing control to connect the communication network 32 to the library controller 2. The components in the controller body 21 are connected to each other via an internal bus 40.

The library controller 2 also comprises, for example: a serial line control unit 45 for performing control to connect the cassette library 1 to the library controller 2 by the transmission lines 24 and 25 of, for example, the RS-232C standard; a central processing control unit 46 including a CPU (central processing unit) and the like, for executing control of the whole library controller 2 and substantial control of the cassette library 1; a read only memory 47 which stores a basic program and the like necessary to perform a basic operation of the library controller 2 itself; a temporary memory 48 serving, for example, as a work area used when the central processing control unit 46 executes a program; a hard disk drive 49 for driving a built-in hard disk for storing various information such as a database regarding system information of the library system; and a floppy disk (written as "FD" in the figure) drive 50 for recording and reproducing information to/from a floppy disk. A program for controlling the cassette library 1 is stored in the hard disk driven by the hard disk drive 49. The central processing control unit 46 executes the program, thereby realizing the function of controlling the cassette library 1.

Figure 4:
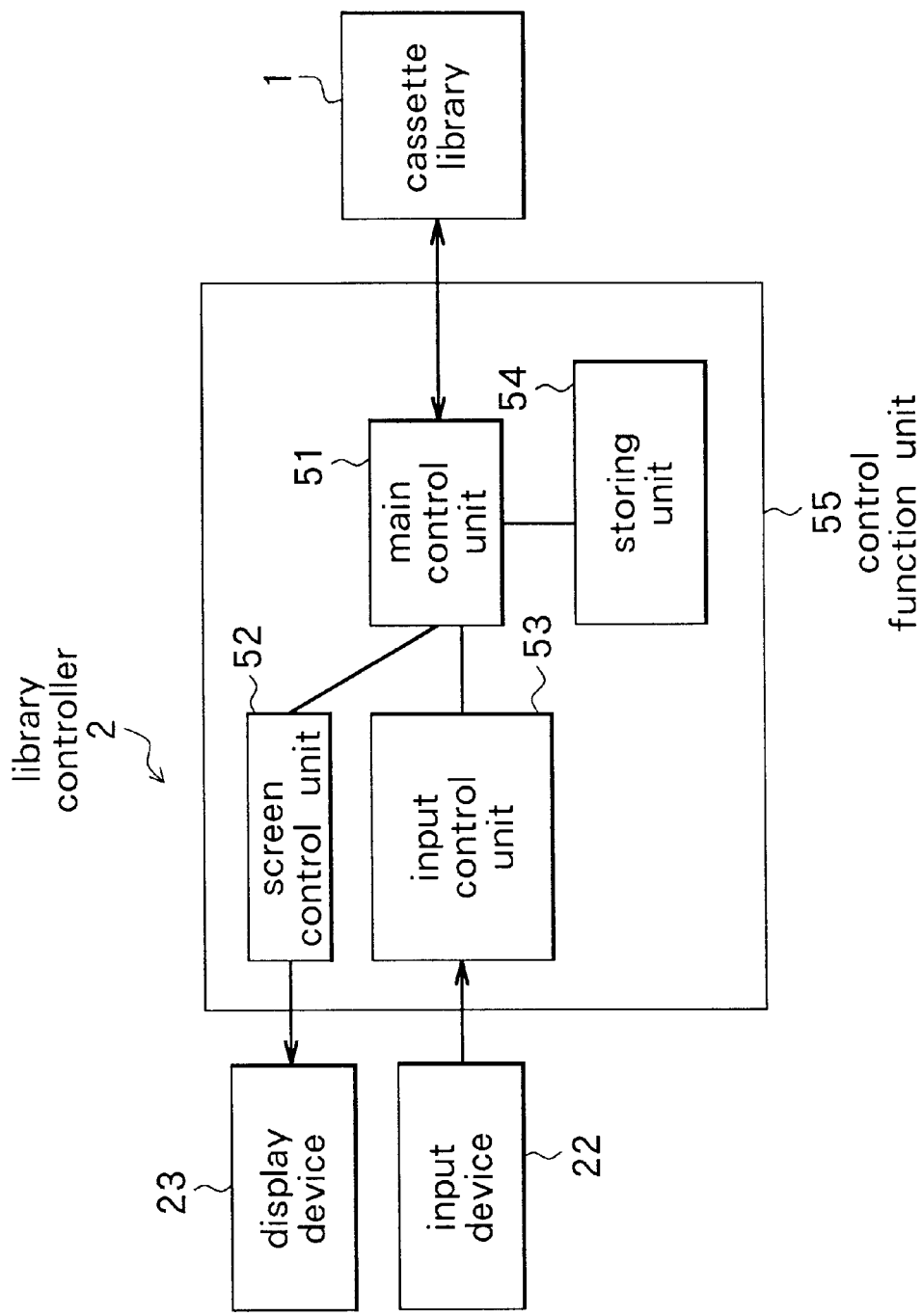
FIG. 4 is a block diagram showing a functional composition of the library controller illustrated in FIG. 1.

FIG. 4 is a block diagram showing a main part of the functional composition of the library controller 2. The library controller 2 comprises a control function unit 55 having the function of controlling the input device 22, the display device 23 and the cassette library 1. The control function unit 55 comprises: a main control unit 51 having the function of performing control of the whole library controller 2 and substantial control of the cassette library 1; a screen control unit 52 which is connected to the main control unit 51 and functions to control the display device 23; an input control unit 53 which is connected to the main control unit 51 and functions to control the input device 22; and a storing unit 54 having the function of storing various information such as a database regarding system information of the library system.

Figure 5:
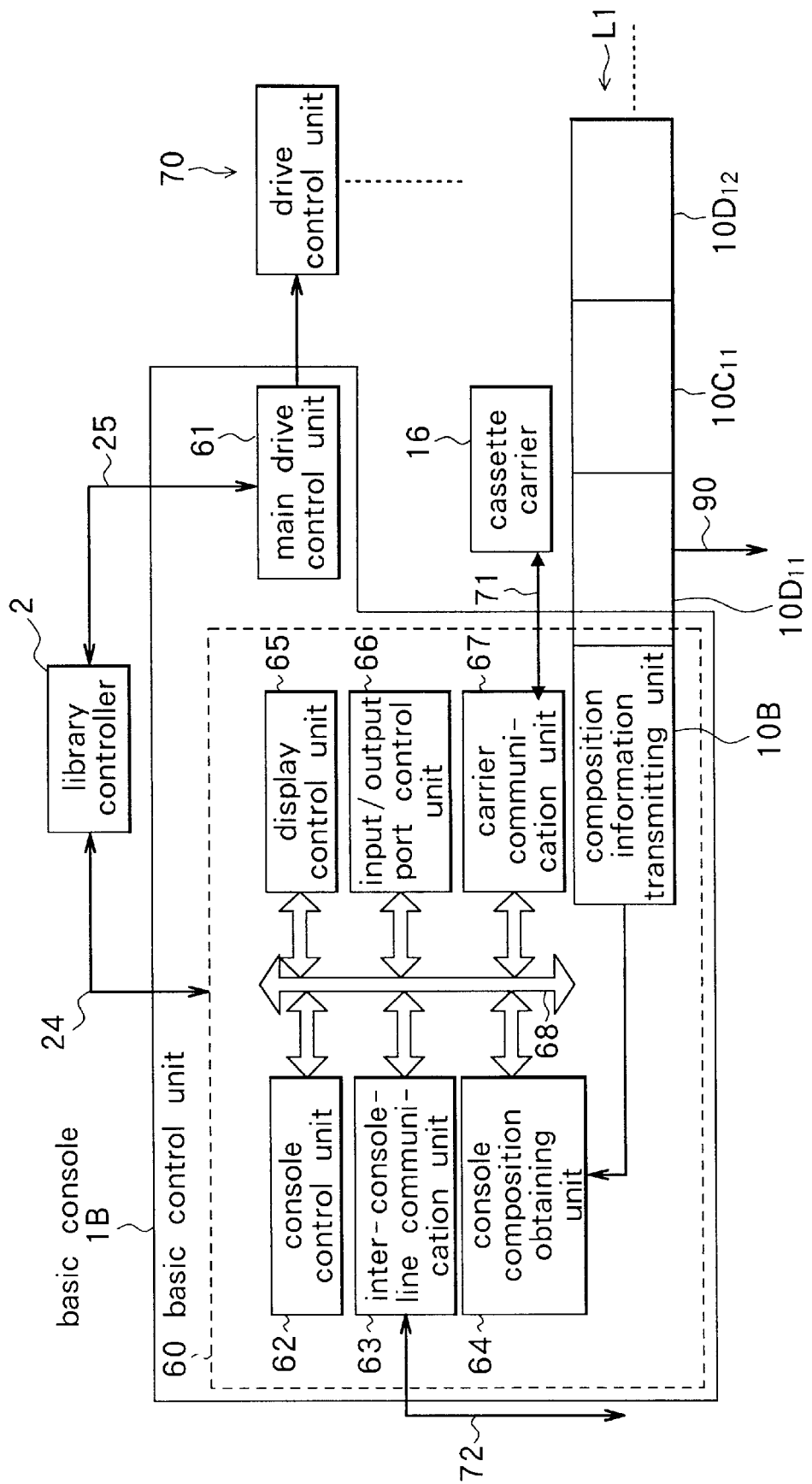
FIG. 5 is a block diagram showing a circuit composition of a basic console illustrated in FIG. 1.

FIG. 5 is a block diagram showing the circuit composition of the basic console 1B. The basic console 1B has: the basic control unit 60 connected to the controller body 21 of the library controller 2 by the transmission line 24, for executing control of the basic console 1B itself, control of the cassette carrier 16, and control of other components; and the main drive control unit 61 which is connected to the controller body 21 of the library controller 2 by the transmission line 25 and connected to the drive control unit 70 in the drive console 1D, for allowing the drive control unit 70 to control the driving apparatus 13. The main drive control unit 61 is realized by, for example, a microcomputer.

The basic control unit 60 comprises: a console control unit 62 for executing control of each of the components in the basic control unit 60, control of the cassette carrier 16, and control of other components; an inter-console-line communication unit 63 for carrying out communications with the extended console lines L2 and L3 via a communication line 72; a console composition obtaining unit 64 for obtaining information on, for example, the composition of each of the consoles which form the console line L1 as a base, the console line L1 including the basic console 1B; a display control unit 65 for performing display control of the display unit 12 (see FIG. 1) provided on the front face of the basic console 1B; an input/output port control unit 66 for executing control of the mechanism of transferring the cassette K in the input/output port 11 (see FIG. 1) provided on the front face of the basic console 1B; and a carrier communication unit 67 for performing communication for control with the cassette carrier 16 by using infrared rays 71. The components of the basic control unit 60 are connected to each other via an internal bus 68. The console control unit 62 is realized by, for example, a microcomputer.

The console composition obtaining unit 64 obtains information on, for example, the composition of each of the consoles which form the console line L1 as a base from composition information transmitting units 10B, $10D_{11}$, $10C_{11}$, $10D_{12}$, ... of the respective consoles.

The console control unit 62 transmits information on the composition of the consoles in the console line L1 as a base obtained by the console composition obtaining unit 64 to the library controller 2. The console control unit 62 also transmits information on the composition of the consoles in other console lines received via the inter-console-line communication unit 63 and other information to the library controller 2.

Figure 6:
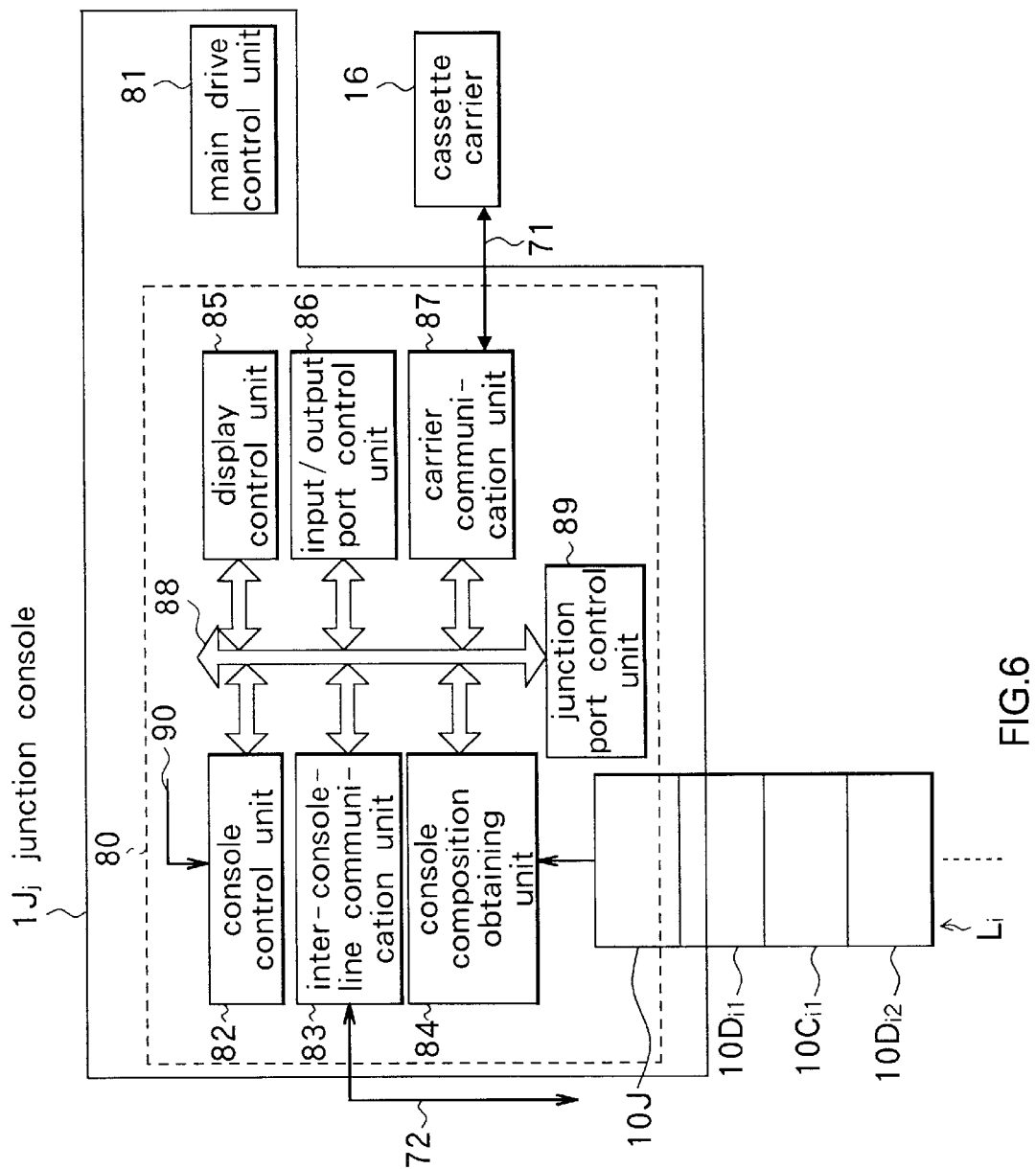
FIG. 6 is a block diagram showing a circuit composition of a junction console illustrated in FIG. 1.

FIG. 6 is a block diagram showing a circuit composition of the junction console $1J_j$ (j=1, 2). The junction console $1J_j$ has the basic control unit 80 for performing control of the junction console $1J_j$ itself, control of the cassette carrier 16 in the console lines Li (i=2, 3) extended by the junction console $1J_j$, and control of other components; and a main drive control unit 81 for allowing the drive control unit 70 to control the driving apparatus 13 in a console line extended by the junction console $1J_j$ as necessary. The main drive control unit 81 is used to interface between the main drive control unit 61 of the basic console 1B and the drive control units 70 in a plurality of drive consoles 1D when a number of drive consoles 1D are used.

The basic control unit 80 has a console control unit 82, an inter-console-line communication unit 83, a console composition obtaining unit 84, a display control unit 85, an input/output port control unit 86, and a carrier communication unit 87. The console composition obtaining unit 84 obtains information on, for example, the composition of the consoles which form the extended console line Li from the composition information transmitting units 10J, $10D_{i1}$, $10_{i1}$, $10D_{i2}$, ... of the respective consoles. The basic control unit 80 also has a junction port control unit 89 for controlling the mechanism of transferring the cassette K in the junction port 18 (see FIG. 2) provided on the side face of the junction console 1J. The components of the basic control unit 80 are connected to each other via an internal bus 88. The components of the basic control unit 80 except for the junction port control unit 89 have the functions basically similar to those of the components of the basic control unit 60 in the basic console 1B.

Information on the composition is transmitted to the console control unit 82 from the composition information transmitting units of the consoles in the other console line (the console line L1 in the example of FIG. 2) to which the junction console $1J_j$ is connected. For example, in the case of the junction console $1J_1$, information 90 on the composition is transmitted from the composition information transmitting unit $10D_{11}$ in the drive console $1D_{11}$ shown in FIG. 5 to the console control unit 82 shown in FIG. 6. Thus, the connection between the console lines can be recognized.

Figure 7:
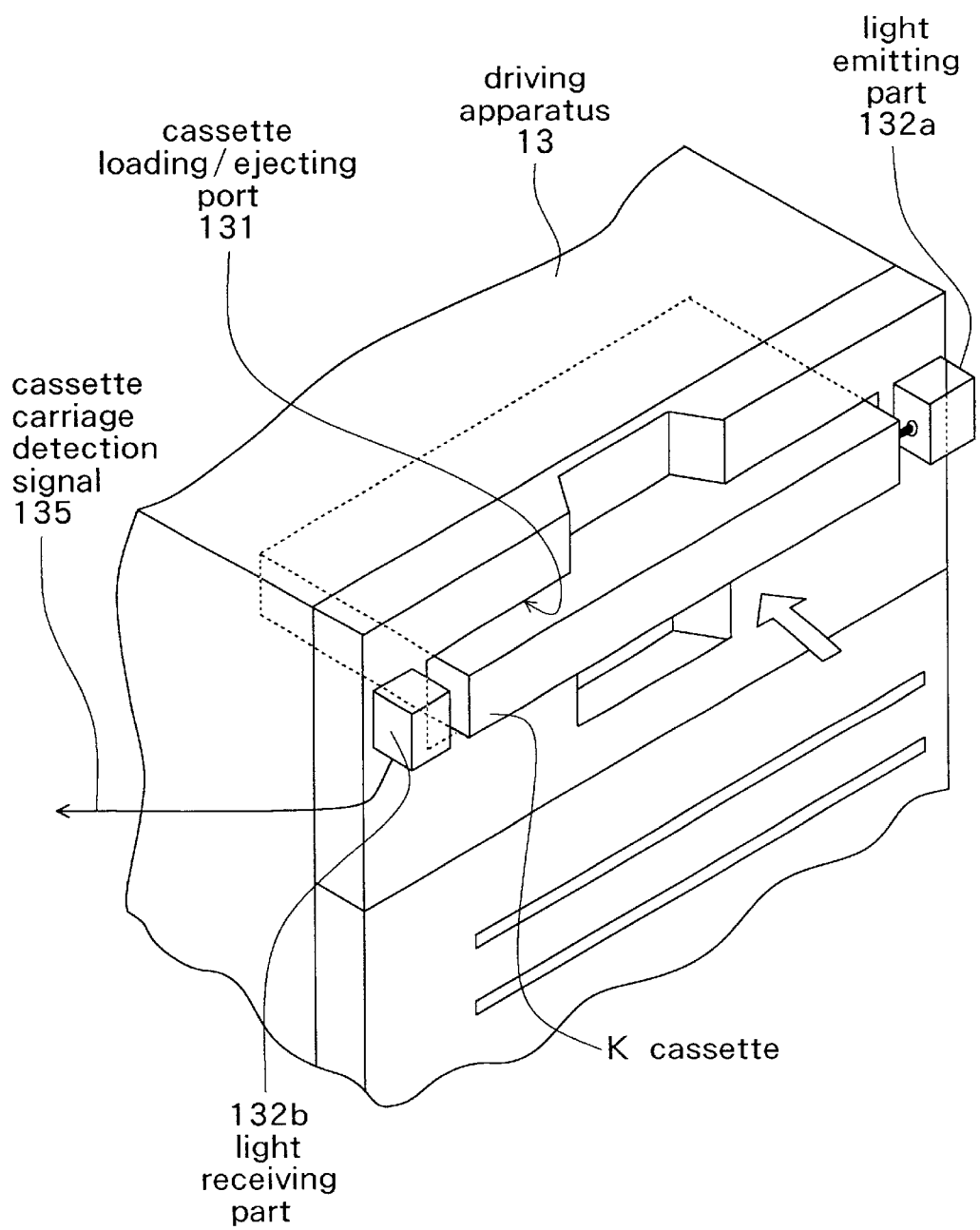
FIG. 7 is a perspective view of the appearance showing a state where a cassette is inserted into a driving apparatus.

FIG. 7 shows the external composition of the driving apparatus 13 in the drive console 1D. As shown in the figure, the driving apparatus 13 has a cassette loading/ejecting port 131 for loading/ejecting the cassette K on the front face side. The cassette K carried from the cassette housing shelf 14 or 15 by the cassette carrier 16 (not shown in FIG. 7) is inserted and loaded into the driving apparatus 13 through the cassette loading/ejecting port 131.

On both ends of the cassette loading/ejecting port 131, a photosensor 132 of transmittance mode having a set of a light emitting part 132a and a light receiving part 133b is disposed. The photosensor 132 is used to sense that the cassette K is loaded into the driving apparatus 13 through the cassette loading/ejecting port 131. When the cassette K passes between the light emitting part 132a and the light receiving part 133b, light emitted from the light emitting part 132a to the light receiving part 133b is temporarily interrupted by the cassette K and is not sensed by the light receiving part 133b. After that, when the cassette K has passed, the light receiving part 133b receives light from the light emitting part 132a again. That is, in the event of loading the cassette K to the driving apparatus 13, the level of a cassette carriage detection signal 135 outputted from the light receiving part 133b changes in the order: H-L-H.

The driving apparatus 13 controlled by the drive control unit 70 (see FIG. 5) is set either in automatic loading mode or in on-demand loading mode. The automatic loading mode is a mode of automatically performing a loading process for reading predetermined retrieval information from a tape 200 of the cassette K after the loading of the cassette K. The on-demand loading mode is a mode of performing the loading process on demand from the library controller 2. The mode setting information on the mode currently set is stored in a non-volatile memory (not shown) in the drive control unit 70. The mode setting information is also stored in a system information file in the hard disk in the hard disk drive 49 in the library controller 2. The loading process corresponds to the "preparing operation" in the invention.

Figure 8:
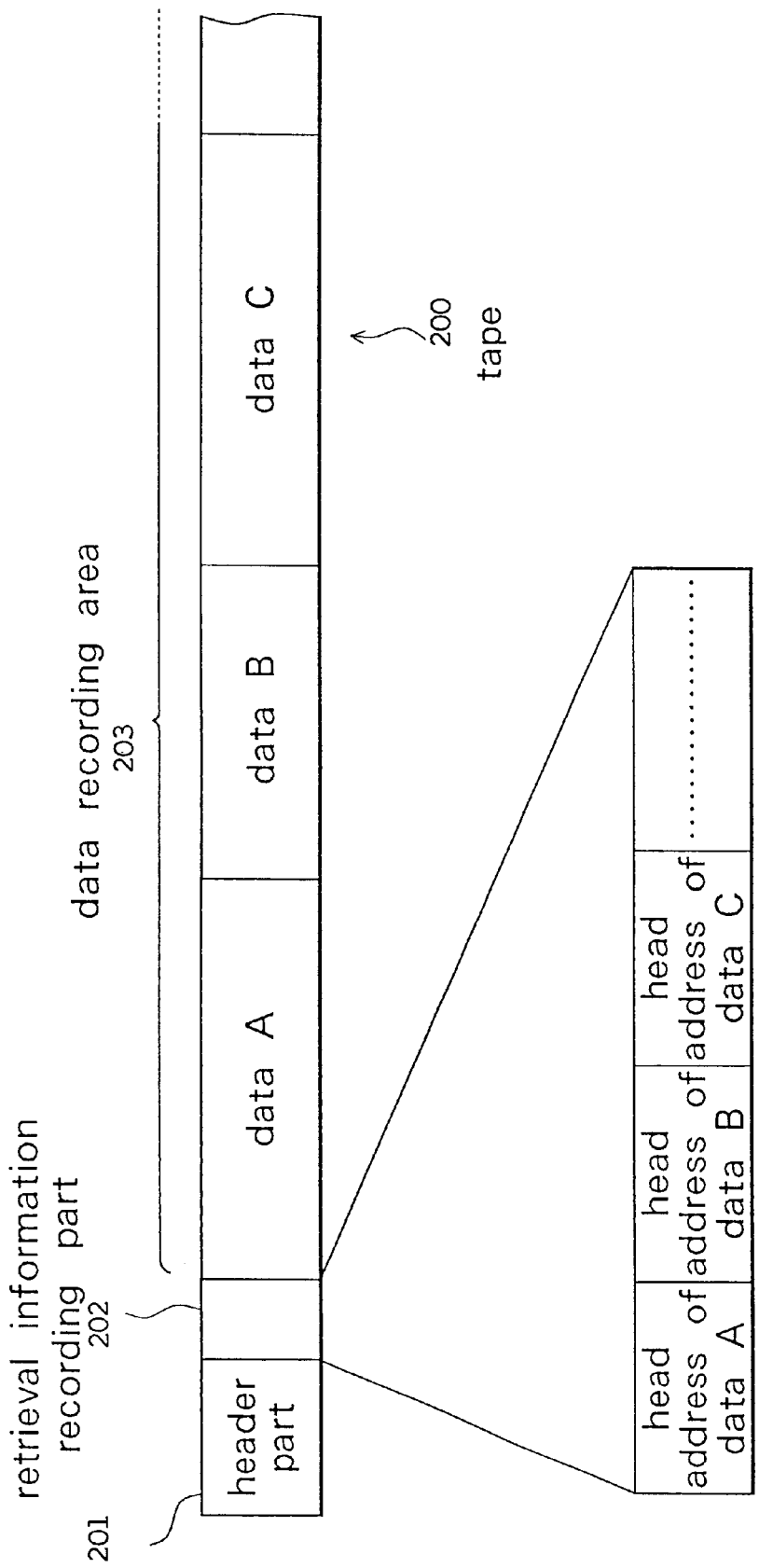
FIG. 8 is an explanatory diagram showing an example of recorded data in a cassette tape.

FIG. 8 schematically shows data recorded on the tape 200 of the cassette K. Subsequent to the header part 201 at the front end of the tape, a retrieval information recording part 202 is provided. Further, in the subsequent data recording area 203, data such as video data or audio data is sequentially recorded. In the retrieval information recording part 202, retrieval information as information on an address of each data recorded on the tape is recorded. In the diagram, data A, B, C, . . . is recorded in the data recording area 203 while the head address of each of the areas in which the data A, B, C, . . . is recorded is recorded as retrieval information in the retrieval information recording part 202. By reading the retrieval information at the beginning, when reproduction of each data is requested later on, the target data can be promptly accessed. When the drive control unit 70 for controlling the driving apparatus 13 confirms completion of the loading process in the driving apparatus 13, the drive control unit 70 sends a loading completion notification to the library controller 2 via the main drive control unit 61 of the basic console 1B.

Referring again to FIG. 7, the cassette carriage detection signal 135 outputted from the light receiving part 133b of the photosensor 132 is sent to the library controller 2 via the console control unit 62 shown in FIG. 5. By the change in the level of the cassette carriage detection signal 135 as H-L-H, the library controller 2 can recognize that the cassette K has been carried to the driving apparatus 13.

The library controller 2 is set in either of the following two modes: one mode in which the library controller 2 immediately determines that loading of the cassette is completed when the library controller 2 recognizes the cassette carriage completion by means of the cassette carriage detection signal 135 from the photosensor 132, without waiting for the end of the loading process in the driving apparatus 13 (hereinbelow, referred to as immediate determining mode); another mode in which the library controller 2 determines that loading of the cassette is completed at the time of the end of the loading process after the library controller 2 recognizes the cassette carriage completion by means of the signal from the photosensor 132 (hereinbelow, referred to as load waiting mode). The mode to be set is preliminarily stored in the system information file in the hard disk mounted in the hard disk drive (see FIG. 3) in the library controller 2.

Figure 9:
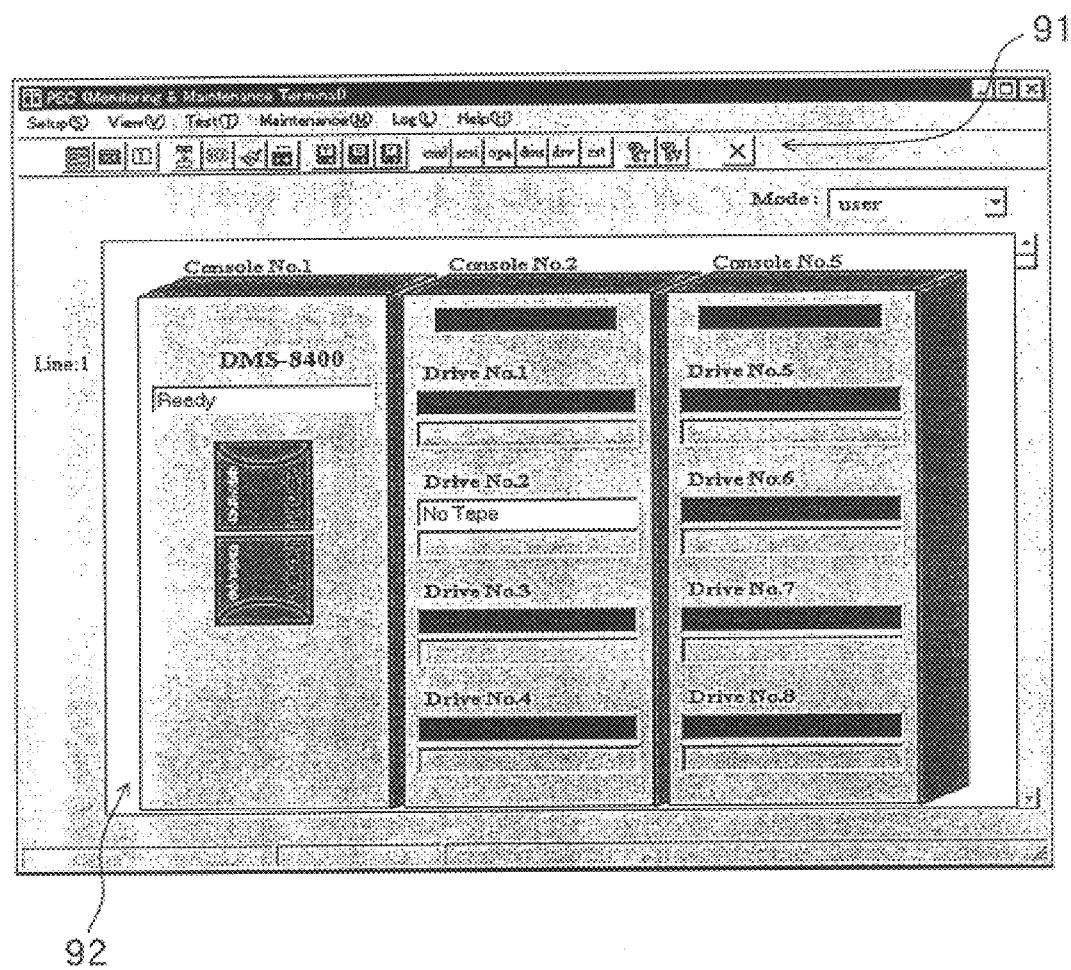
FIG. 9 is an explanatory representation of a main view for control displayed in the library controller illustrated in FIG. 1.
Figure 10:
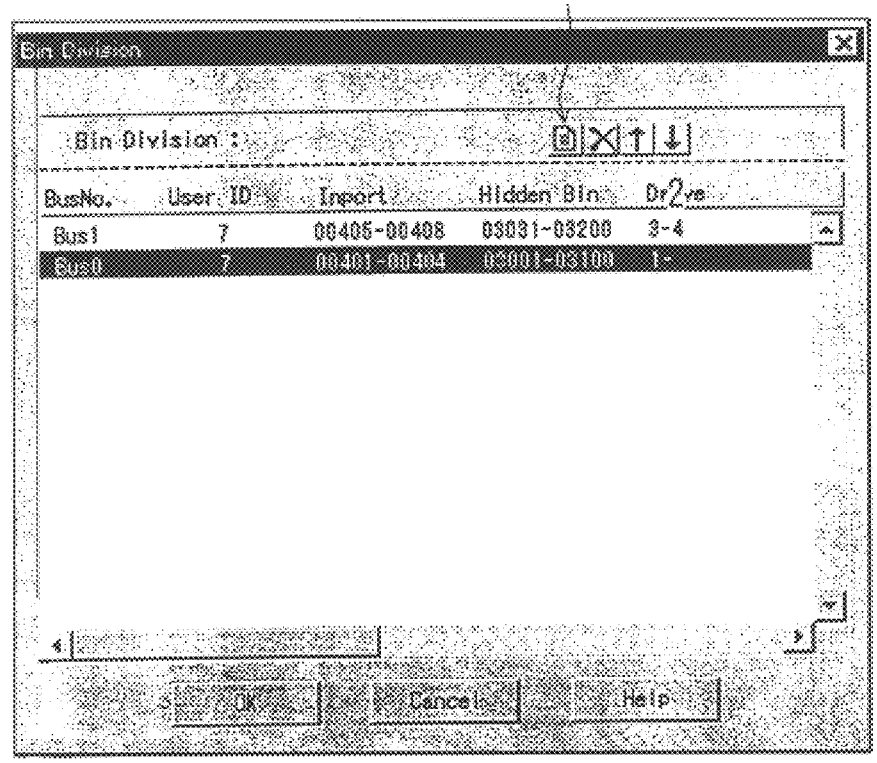
FIG. 10 is an explanatory representation of a view for setting occupancy displayed in the library controller illustrated in FIG. 1.
Figure 11:
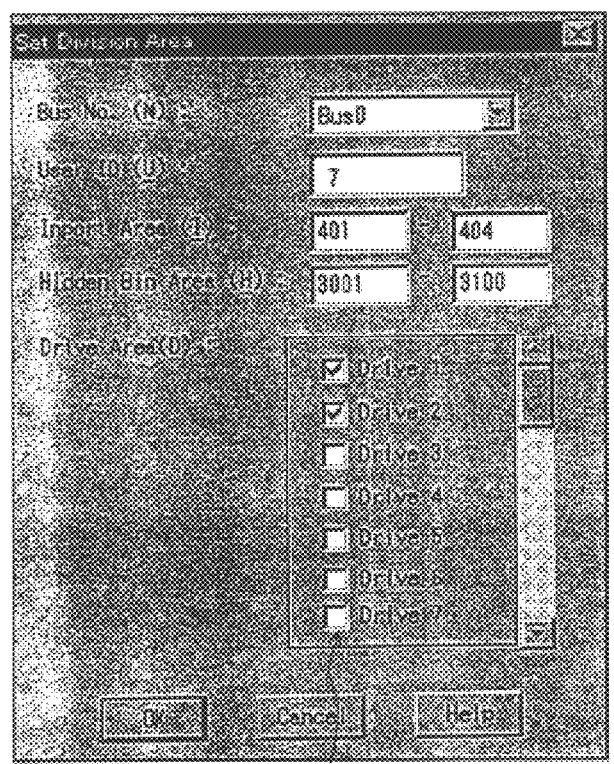
FIG. 11 is an explanatory representation of another view for setting occupancy displayed in the library controller illustrated in FIG. 1.

FIGS. 9 to 11 show an example of the view for control displayed on the display device 23 of the library controller 2. The library controller 2 allows the display device 23 to display a view for control realizing the interface in the GUI (Graphical User Interface) environment in which the user can perform operations on the view by using a mouse or the like.

The view for control shown in FIG. 9 is displayed as, for example, a main view for control when the library controller 2 is started. On the main view, a menu bar or the like for instructing the control of the library system is displayed in a predetermined area (area 91 in FIG. 9). Also, information on the basic composition of the cassette library 1 is graphically displayed in a predetermined area (area 92 in FIG. 9) so that the user can immediately grasp the composition. At the time of activation of the library controller 2, the library controller 2 acquires information on the current composition of the console, such as the kind of each console and connection between the consoles, from the cassette library 1. On the basis of the acquired information, the graphic view in the form shown in the area 92 in FIG. 9 is displayed. As described above, the console composition obtaining unit 64 in the basic control unit 60 of the basic console 1B obtains information on the consoles transmitted from the composition information transmitting units 10B, $10D_{11}$, $10C_{11}$, $10D_{12}$, . . . . Furthermore, the inter-console-line communication unit 63 similarly obtains information on the console composition from the composition information transmitting units of the other consoles. The information on the composition and the like is transmitted to the library controller 2 via the console control unit 62. Thereby, the library controller 2 can display the graphic view as shown in FIG. 9 by using the information.

In FIGS. 10 and 11, in the parts designated by [Bus No.], information on the transmission lines to which the host computers 3a and 3b are connected is indicated. For example, Bus0 corresponds to the transmission line 31a (FIG. 1) to which the host computer 3a is connected while Bus1 corresponds to the transmission line 31b to which the host computer 3b is connected. In the parts designated by [Inport], the areas of the input/output ports of the input/output port 11 of the basic console 1B and the input/output port 17 of the Junction console 1J occupied by the host computers 3a and 3b are indicated by physical address numbers. In the parts designated by [Hidden Bin], areas of the housing sections in the cassette housing shelf 14 of the drive console 1D and the cassette housing shelf 15 of the cassette console 1C occupied by the host computers 3*a* and 3*b* are indicated by physical address numbers. In the parts designated by [Drive], areas of the driving apparatuses 13 of the drive console 1D occupied by the host computers 3*a* and 3*b* are indicated by physical address numbers.

FIG. 10 shows a main view for setting, which is used to set occupancy. In the main view for setting, information on occupancy setting for all of the host computers 3*a* and 3*b* connected to the library controller 2 is shown. The user can select the host computer 3*a* or 3*b* for which occupancy setting is to be performed, on the main view for setting occupancy. In FIG. 10, the selected part is shown in a state where white text is on black. The main view for setting as shown in FIG. 10 is displayed by selecting "Setup" menu in the menu bar on the main view for control as shown in FIG. 9 and then selecting "Bin Division" menu in a pull-down menu (not shown).

FIG. 11 shows a view displayed when the host computer 3*a* or 3*b* for which the occupancy setting is to be performed is selected (the left mouse button is double clicked) on the main view for occupancy setting as shown in FIG. 10, or when a new creation button 120 shown in FIG. 10 is selected to perform occupancy setting for a new host computer. The user can designate the area to be occupied for the host computers 3*a* and 3*b* by inputting an address number or the like on the setting view as shown in FIG. 11. The library controller 2 performs an internal process regarding setting occupancy on the basis of the data designated on the setting view as shown in FIG. 11. The hard disk of the library controller 2 includes three tables: (i) a basic table for storing an address number indicative of an area to be occupied; (ii) an extension table used together with the basic table when physically discontinuous address numbers are designated; (iii) a conversion table for converting the physically discontinuous address numbers into continuous address numbers when the physically discontinuous address numbers are designated and for allocating the converted continuous address numbers as logical address numbers managed by the host computers 3*a* and 3*b*.

On the setting view as shown in FIG. 11, with respect to the occupied area of the driving apparatus 13, provided are check boxes 110 by which the user can allocate the driving apparatuses 13 with the physically discontinuous address numbers to the host computer 3*a* or 3*b*. On the setting view as shown in FIG. 11, the user can designate arbitrary check boxes 110, thereby designating the driving apparatuses 13 with the physically discontinuous address numbers to one of the host computers 3*a* and 3*b*. When the physically discontinuous address numbers are designated with respect to the driving apparatuses 13 on the setting view as shown in FIG. 11, the library controller 2 records information on the discontinuous address numbers by using the extension table. Further, when the physically discontinuous address numbers are designated with respect to the driving apparatuses 13 on the setting view as shown in FIG. 11, the library controller 2 converts the physically discontinuous address numbers to continuous address numbers by using the conversion table and allocates the converted continuous address numbers as logical address numbers managed by the host computers 3*a* and 3*b*.

FIG. 12 are explanatory diagrams showing the structure of each of the tables for allocating address numbers. The tables are used for the occupancy setting process by the library controller 2. FIG. 12A shows a basic table used for the occupancy setting process, in which information on the occupied area with respect to areas of the housing sections of the cassette housing shelves 14 and 15 is described by the head physical address number in the occupied area (internal BIN head No.) and the end address number (internal BIN end No.). In the basic table, the information on the occupied area with respect to the input/output ports of the input/output ports 11 and 17 is also described by the head address number (INPORT head No.) and the end address number (INPORT end No.) of the physical address numbers of the occupied area. In the basic table, the information on the occupied area with respect to the driving apparatuses 13 is described by the head address number (drive head No.) and the end address number (drive end No.) of the physical address numbers of the occupied area. Further, in the basic table, information on the existence of the extension table subsequent to the basic table (continuation present/absent) is described. When the extension table subsequent to the basic table exists, (continuation present) is described.

FIG. 12B shows the extension table used when the physically discontinuous address numbers are designated with respect to the driving apparatuses 13. In the extension table, described are the head physical address number (drive head No.) and the end address number (drive end No.) of the occupied area at the next stage of the occupied area with respect to the driving apparatuses 13 described in the basic table. In the extension table, information on the existence of the subsequent extension table (continuation present/absent) is described. When the subsequent extension table exists, (continuation present) is described.

FIG. 13 is an explanatory diagram showing the structure of the conversion table for converting the physically discontinuous address numbers to the continuous address numbers. To illustrate, assume that the driving apparatuses 13 with physical address numbers 1, 2, 5, and 6 are allocated to the host computer 3*a* while the driving apparatuses 13 with the physical address numbers 3, 4, 7 and 8 are allocated to the host computer 3*b*. Then, the physically discontinuous address numbers 1, 2, 5 and 6 are converted into continuous logical address numbers 1001 to 1004 by the conversion table as shown in FIG. 11 while the physically discontinuous address numbers 3, 4, 7 and 8 are converted into continuous logical address numbers 1005 to 1008.

As mentioned above, in the embodiment, the library controller 2 has the conversion table for converting the physically discontinuous address numbers to continuous address numbers. Consequently, even when discontinuous address numbers are allocated in practice, the library controller 2 can simulate as if the driving apparatuses 13 with continuous address numbers were apparently used by the host computers 3*a* and 3*b*. This makes it possible to set occupancy of the drive apparatus 13 having an arbitrary address number, even when the transmission lines for connecting the drive apparatus 13 to the host computers 3*a* and 3*b* are in the format according to the standard protocol of the SCSI standard which inherently cannot deal with discontinuous data.

The operation of the library system having a composition as mentioned above will now be described. First, the operation of the whole library system will be described.

When the library controller 2 is activated, on the display apparatus 23 of the library controller 2, the main view for control in the GUI environment as shown in FIG. 9 is displayed. The user executes operations using a mouse or the like on the displayed main view for control, thereby performing various settings for controlling the library system.

In response to a request from the host computer 3*a* and 3*b*, the library controller 2 transmits a command to move a desired cassette K among the input/output port 11 in the basic console 1B, the cassette housing shelf 15 in the cassette console 1C, the driving apparatus 13 in the drive console 1D, and the like by using the cassette carrier 16 or a command to record or reproduce information in the driving apparatus 13 in the drive console 1D to the basic console 1B in the cassette library 1. A command to move the cassette K by using the cassette carrier 16 is transmitted to the basic control unit 60 in the basic console 1B via the transmission line 24. A command to make the driving apparatus 13 record or reproduce information is transmitted to the main drive control unit 61 in the basic console 1B via the transmission line 25.

The basic control unit 60 controls the cassette carrier 16 on the basis of a command from the library controller 2 received via the transmission line 24. The control of the basic control unit 60 over the cassette carrier 16 is exercised by means of infrared communications via the carrier communication unit 67 (see FIG. 5). Under the control of the basic control unit 60, the cassette carrier 16 performs a carrying operation of, for example, carrying and delivering the cassette K loaded from the input/output port 11 in the basic console 1B to the cassette housing shelf 15 in the cassette console 1C. In the console line extended by the junction console 1J, the basic control unit 80 in the junction console 1J receives a command sent from the library controller 2 through the basic control unit 60 in the basic console 1B and controls the cassette carrier 16 in the extended console line in a manner similar to the basic control unit 60.

The main drive control unit 61 controls the drive control unit 70 in the drive console 1D, on the basis of a command from the library controller 2 received via the transmission line 25, to make the driving apparatus 13 record or reproduce information. The drive control unit 70 makes the driving apparatus 13 record or reproduce information under the control of the main drive control unit 61.

Figure 14:
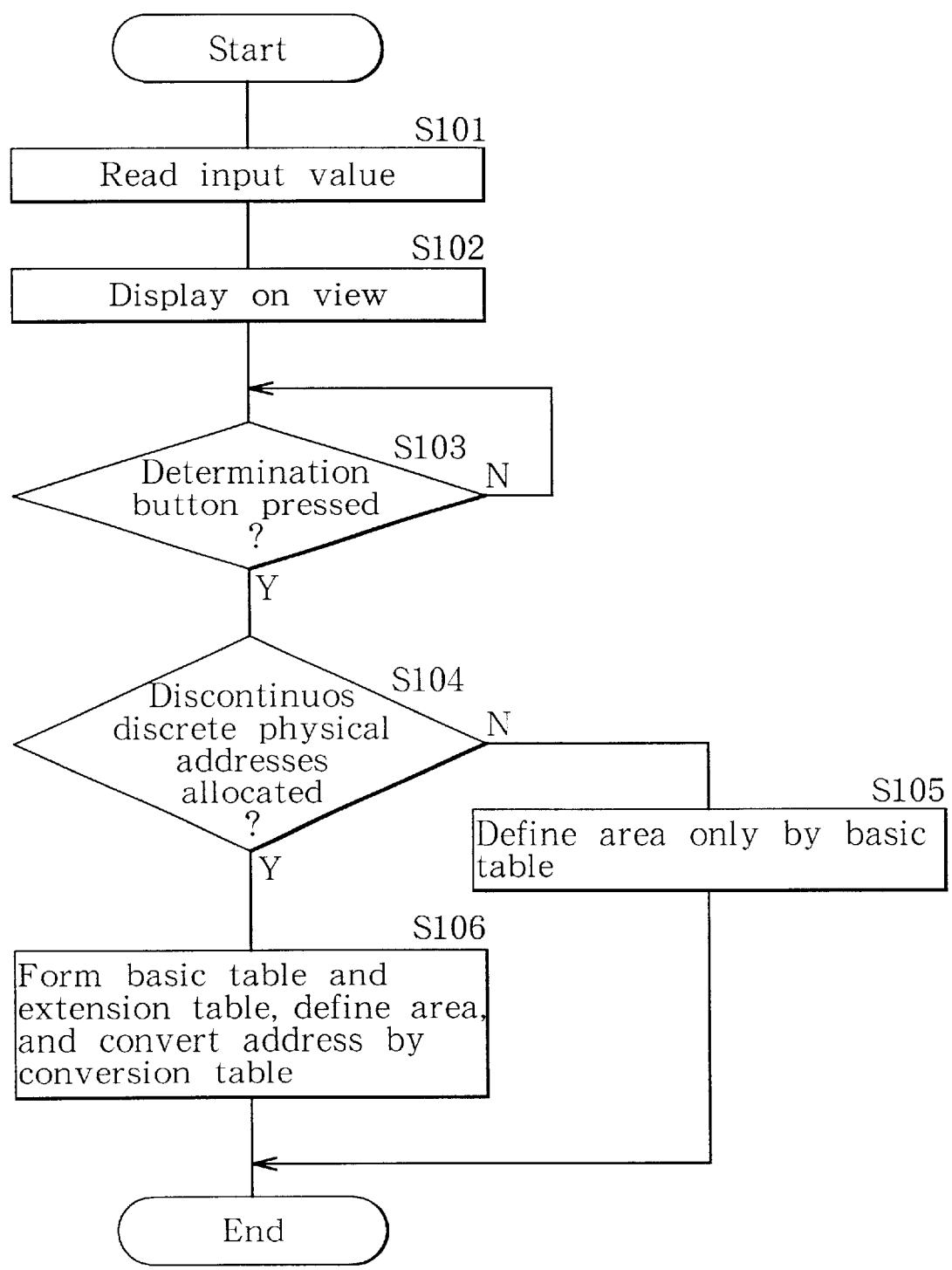
FIG. 14 is a flowchart for explaining an occupancy setting process executed in the library controller illustrated in FIG. 1.

The operation of processing for setting occupancy will be described according to the flowchart shown in FIG. 14. The following description includes the description of the method of setting occupancy for the recording medium library device according to the embodiment.

When the user selects the host computer 3a or 3b for which occupancy setting is to be performed on the main view (see FIG. 10) for setting occupancy displayed on the display device 23, the library controller 2 displays a setting view (see FIG. 11) regarding the selected host computer 3a or 3b. When the new creation button 120 is selected on the main view for setting occupancy shown in FIG. 10, the library controller 2 also displays the setting view as shown in FIG. 11. When the address number or the like indicative of the area to be occupied is inputted with a mouse, keyboard or the like by the user, the library controller 2 reads the input value (step S101) and the read input value is displayed on the setting view (step S102).

The library controller 2 determines whether the determination (OK) button is pressed or not on the setting view (step S103). If the determination button is not pressed (N), the determination of step S103 is repeated. If the determination button is pressed (step S103: Y), the library controller 2 determines whether discontinuous discrete values are allocated as the physical addresses designated by the user (step S104). If the discontinuous values are not allocated as physical addresses (N), the occupied area is set only by using the basic table (see FIG. 12A) (step S105).

If discontinuous values are allocated as physical addresses (step S104: Y), the physical address information is recorded by using both the basic table and the extension table (see FIG. 12B), and physically discontinuous address numbers are converted to continuous logical address numbers by using the conversion table (see FIG. 13) (step S106). Thus, a library controller 2 simulates as if the continuous address numbers were apparently set in the host computers 3a or 3b.

The connection between the host computer 3a or 3b and the driving apparatus 13 have to be established in correspondence with the physical address numbers allocated to the host computer 3a or 3b.

A modification of the embodiment will be described.

Figure 15:
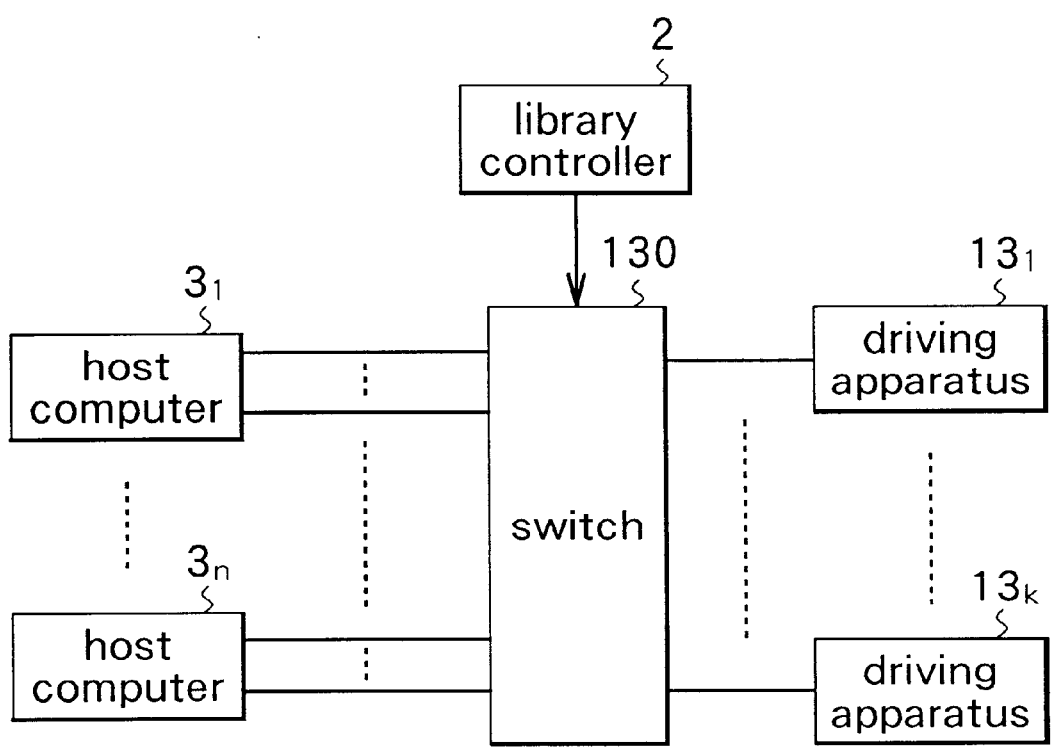
FIG. 15 is an explanatory diagram for explaining a modification of the library system shown in FIG. 1.

FIG. 15 is an explanatory diagram for explaining the modification. To illustrate, assume that a plurality of driving apparatuses $13_1$, $13_2$, . . . $13_k$ (k denotes an integer of 2 or larger) having arbitrary address numbers are occupied by a number of host computers $3_1$, $3_2$, . . . $3_n$ (n is an integer of 2 or larger). In this case, new occupancy setting or a change in occupancy setting may result in the possibility that the process of switching the transmission lines connecting the host computers $3_1$, $3_2$, . . . $3_n$ and the driving apparatuses $13_1$, $13_2$, . . . $13_k$ becomes complicated.

In the modification, therefore, a switch 130 for automatically switching the connection between the host computers $3_1$, $3_2$, . . . $3_n$ and the driving apparatuses $13_1$, $13_2$, . . . $13_k$ is provided at some midpoints in the transmission lines between the host computers $3_1$, $3_2$, . . . $3_n$ and the driving apparatuses $13_1$, $13_2$, . . . $13_k$. The switch 130 is controlled by the library controller 2 in accordance with occupancy setting. The switch 130 connects the host computers $3_1$, $3_2$, . . . $3_n$ to the driving apparatuses $13_1$, $13_2$, . . . $13_k$ in correspondence with the physical address numbers allocated to the host computers $3_1$, $3_2$, . . . $3_n$. As a result, in the cases of new occupancy setting or a change in occupancy setting, the connection between the host computers $3_1$, $3_2$, . . . , $3_n$ and the driving apparatus $13_1$, $13_2$, . . . , $13_k$ can be automatically changed. Thereby, the process of switching the transmission lines can be readily performed.

Otherwise, the composition, operation and effects of the modification is similar to those of the above-mentioned embodiment.

Although the case where occupancy setting of the driving apparatuses 13 has been described in the embodiment, occupancy setting of the housing sections of the cassette housing shelves 14 and 15 and the occupancy setting of the input/output ports can be executed in a manner similar to the case with the driving apparatuses 13.

Figure 16:
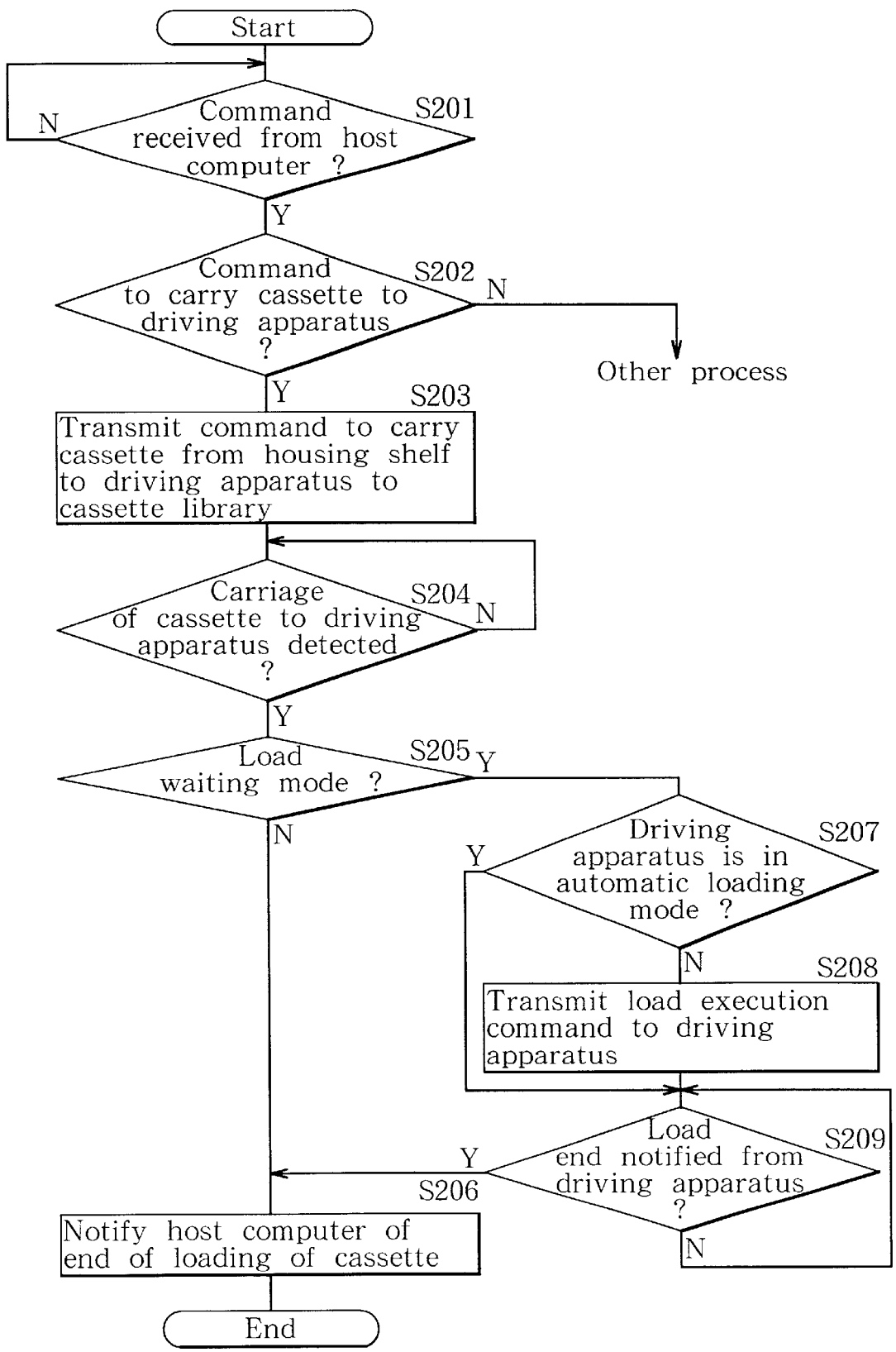
FIG. 16 is a flowchart for explaining a process for carrying a cassette executed by the library controller shown in FIG. 1.

With reference to FIG. 16, the operation as to the features characteristic of the invention in the library system will be described below. FIG. 16 shows mainly the operation of the central processing control unit 46 in the controller body 21 (see FIG. 3) of the library controller 2. As shown in the flowchart, the central processing control unit 46 of the library controller 2 always checks whether a command is supplied from the host computer 3 or not. If a command is supplied from the host computer 3 (step S201; Y in FIG. 16), the central processing control unit 46 reviews the inputted command. If the inputted command is a command to carry the cassette K in the cassette housing shelf 14 or 15 to the driving apparatus 13 (step s202; Y), the central processing control unit 46 checks the address of the housing section in the cassette housing shelf 14 or 15 and the address of the driving apparatus 13 designated by the command, while creating a command to carry the cassette K from the cassette housing shelf 14 or 15 to the driving apparatus 13 by using the obtained address information, and then transmits the command to the cassette library 1 (step S203). In the case of other commands (step S202; N), other processes are performed.

The command to carry the cassette K from the cassette housing shelf 14 or 15 to the driving apparatus 13 is sent from the library controller 2 to the basic control unit 60 in the basic console 1B in the cassette library 1. The command is further sent from the carrier communicating unit 67 in the basic control unit 60 to the cassette carrier 16. The cassette carrier 16 which receives the command unloads the cassette K from the designated housing section of the cassette housing shelf 14 or 15 and carries the cassette K to the designated driving apparatus 13. As shown in FIG. 7, the cassette K carried to the driving apparatus 13 is inserted to the inside through the cassette loading/ejecting port 131. The operation is detected by the photosensor 132. Specifically, the cassette carriage detection signal 135 from the light receiving part 133b is sent to the console control unit 62 in the basic control unit 60 in the basic console 1B and further to the library controller 2, thereby the central processing control unit 46 recognizes the operation.

The central processing control unit 46 of the library controller 2 transmits the command to carry the cassette K from the cassette housing shelf 14 or 15 to the driving apparatuses 13 to the cassette library 1 in step s203 and then monitors the response from the cassette library 1. If the central processing control unit 46 detects the carriage of the cassette K to the driving apparatus 13 by means of the cassette carriage detection signal 135 from the photosensor 132 of the driving apparatus 13 (step S204; Y), the central processing control unit 46 reads out the system information file of the hard disk drive 49 and determines whether the load waiting mode or immediate determining mode is set for the system. If it is found that the immediate determining mode is set (step s205; N), the central processing control unit 46 immediately determines that the cassette loading has been completed, without waiting for the notification of the end of the loading process from the drive control unit 70 which controls the driving apparatus 13. Then the central processing control unit 46 sends the notification of completion of loading of the cassette to the host computer 3 (step S206).

On the other hand, if the load waiting mode is set (step S205; Y), the central processing control unit 46 further reads the system information file of the hard disk drive 49 and checks the mode (either the automatic loading mode or the on-demand loading mode) of the driving apparatus 13. If it is found that the driving apparatus 13 is set in on-demand loading mode (step S207; N), the central processing control unit 46 transmits a load executing command to the drive control unit 70 for controlling the driving apparatus 13 (step S208) and, after that, monitors a response from the drive control unit 70 of the driving apparatus 13. If the driving apparatus 13 is set in automatic loading mode (step S207; Y), the central processing control unit 46 continues to monitor the response from the drive control unit 70 of the driving apparatus 13. If the load end is notified by the drive control unit 70 of the driving apparatus 13 (step S209; Y), eventually the central processing control unit 46 determines that the cassette loading has been completed and then sends the notification of completion of loading of the cassette to the host computer 3 (step S206).

When the host computer 3 receives the notification of completion of loading of the cassette from the library controller 2, the host computer 3 transmits a command to carry the next cassette to the library controller 2. Then similar operations are repeated.

In the foregoing embodiment, the components of the photosensor 132 are disposed on both sides of the cassette loading/unloading port 131 on the front face of the driving apparatus 13. The components of the photosensor 132, however, can be disposed in other positions, for example, inside the driving apparatus 13.

In the embodiment described above, the library controller 2 can select either the load waiting mode or immediate determining mode. It is also possible that only the immediate determining mode is provided.

Also, in the embodiment described above, the drive control unit 70 for controlling the driving apparatus 13 is set in either automatic loading mode or on-demand loading mode. It is also possible that only the automatic loading mode is provided.

Figure 17:
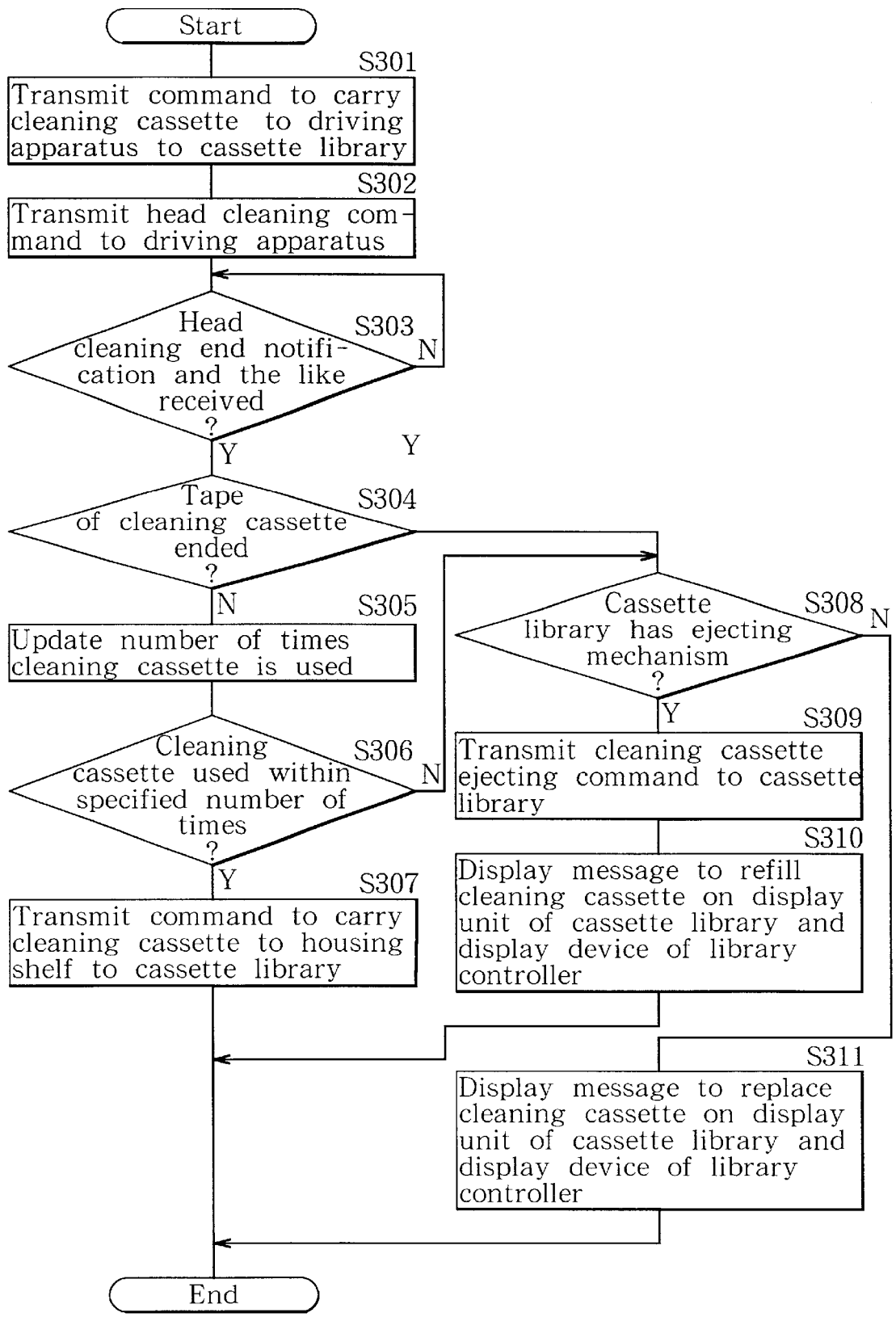
FIG. 17 is a flowchart for explaining a process for cleaning the head of the driving apparatus executed by the library controller shown in FIG. 1.

Description will now be made in further detail of the operation of loading the cleaning cassette KC (hereinbelow, the cassette K and the cassette KC are described so as to be distinguished from each other) into the driving apparatus 13 and cleaning the data write/read heads in the driving apparatus 13 and the tape travel system such as capstan. FIG. 17 shows the operation mainly related to the head cleaning process in the central processing control unit 46 in the controller body 21 (see FIG. 3) of the library controller 2.

As shown in the flowchart, when the head cleaning timing of the driving apparatus 13 arrives, the central processing control unit 46 of the library controller 2 transmits a command to carry the cleaning cassette to the driving apparatus 13 to the cassette library 1 (step S301 in FIG. 17). The timing of cleaning the head of the driving apparatus 13 is set when the cumulative time of use of the recording and reproducing head reaches, for example, 50 hours from the previous head cleaning. The timing may be also a time point when the time of use reaches time longer or shorter than 50 hours. Whether the timing of the head cleaning has arrived or not is determined by, for example, the central processing control unit 46 of the library controller 2. Specifically, the central processing control unit 46 always cumulatively counts the time of use of the recording and reproducing head of the driving apparatus 13 and determines that the timing arrives when the count value reaches a value set as information on time of use of head in the system information file in the hard disk drive 49. It is also possible to determine the time of use by another method. In another alternative, the cleaning may be performed when a cleaning request is issued from the host computer 3.

A command to carry the cleaning cassette sent from the central processing control unit 46 of the library controller 2 is transmitted to the cassette carrier 16 via the basic control unit 60 (see FIG. 5) of the basic console 1B. The cassette carrier 16 unloads the cleaning cassette from the designated housing section in the cassette shelf 15 in accordance with the received command and carries the cleaning cassette to the designated driving apparatus 13. When the loading of the cleaning cassette is completed, the drive control unit 70 of the driving apparatus 13 notifies the completion to the library controller 2 via the main drive control unit 61 (see FIG. 5) of the basic console 1B.

When the central processing control unit 46 of the library controller 2 receives the notification of the loading completion of the cleaning cassette, the central processing control unit 46 transmits the head cleaning command to the driving apparatus 13 (step S302). The command is sent to the drive control unit 70 via the main drive control unit 61 (see FIG. 5) of the basic console 1B. The driving apparatus 13 executes the head cleaning by using the cleaning cassette. When the head cleaning for a predetermined time (for example, about 5 to 10 seconds) is normally finished, the drive control unit 70 notifies the central processing control unit 46 of the end of the head cleaning. If the head cleaning is finished normally, the drive control unit 70 further checks whether or not the tape of the cleaning cassette has ended at the time point of completion of cleaning. The drive control unit 70 sends the result to the central processing control unit 46 together with the notification of the head cleaning end. If the tape of the cleaning cassette KC has ended during the head cleaning of this time and the cleaning has been interrupted, the drive control unit 70 notifies the central processing control unit 46 of interruption of the cleaning.

If the central processing control unit 46 receives the information on the end of the tape and the cleaning end notification, or receives cleaning interruption notification from the drive control unit 70 (step S303; Y), the central processing control unit 46 determines whether the cleaning cassette is in a usable state or not, by means of the notification. In other words, if the head cleaning has been normally finished and the tape has not been ended yet (step S304; N), the central processing control unit 46 performs updating by incrementing the number of times the cleaning cassette is used in the system information file stored in the hard disk drive 49 only by one (step S305). If the number of times the cleaning cassette is used is still within a specified number after the updating (step S306; Y), the central processing control unit 46 sends a command to carry the cleaning cassette from the driving apparatus 13 to the original housing section in the cassette housing shelf 15 to the cassette library 1 (step S307).

On the other hand, as a result of the determination in step S304, in the case where the tape of the cleaning cassette is ended although the head cleaning is normally finished, in the case where the tape is ended during the cleaning and the cleaning is accordingly interrupted (step S304; Y), or in the case where the number of times the cleaning cassette is used reaches a specified number after updating the number of times in step S305 (step S306; N), the central processing control unit 46 executes the processes of step S308 and subsequent steps.

In step S308, the central processing control unit 46 checks whether or not the cassette library 1 has the input/output port 11 as the cassette ejecting mechanism. The process is performed by reading the system information file in the hard disk drive 49 and checking information on presence or absence of the ejecting mechanism. If the cassette library 1 has the input/output port 11 (step S308; Y), the central processing control unit 46 transmits a cleaning cassette ejecting command to the cassette library 1 (step S309) and displays a message to refill a new cleaning cassette on the display unit 12 in the basic console 1B of the cassette library 2 and the display device 23 of the library controller 2 (step S310). On the other hand, if the cassette library 1 does not have the input/output port 11 (step S308; N), the central processing control unit 46 displays a message to replace the cleaning cassette on the display unit 12 in the basic console 1B of the cassette library 2 and the display device 23 of the library controller 2 (step S311).

In the embodiment described above, the case of using a cleaning cassette of a type which is not rewound and used has been described. However, the invention is not limited to this but can be applied to a cleaning cassette of a type which can be rewound and repeatedly used. In this case, a cleaning cassette may be rewound when no tape of the cleaning cassette is left, and used again from the head. The count value of the number of times the cleaning cassette is used is not reset with each tape rewinding operation but accumulated. When the number of times reaches a specified number, it may be determined that the cleaning cassette has been used to the limit.

Although the embodiment has been described on the assumption that the recording medium is a cassette tape, the invention is not limited to this but can be applied to recording media in other forms (for example, disk-shaped recording media such as optical disk or replaceable magnetic disk). In this case, obviously, the form of the cleaning medium corresponds to the form of the recording medium.

As described above, according to the recording medium library device or its occupancy setting method of the invention, a part to be occupied is set for one or more clients by converting between physical addresses and logical addresses managed by the client. Consequently, occupancy can be freely set for the client. In this case, with respect to two or more recording and reproducing means, in addition to setting a part to be occupied and performing conversion between physical addresses and logical addresses, the information transmission lines between the recording and reproducing means and the client can be switched in accordance with the conversion between the physical addresses and logical the addresses by control means. Consequently, the information transmission lines between the recording and reproducing means and the client can be automatically switched in accordance with the conversion between the physical addresses and the logical addresses by the control means.

According to another recording medium library device, a method of determining completion of loading of a recording medium therefor or a method of notifying completion of loading of a recording medium therefor, a request to load the recording medium housed in the housing section in the recording medium housing means to the recording and reproducing means is sent to the carrying means, and the carriage of the recording medium to the recording and reproducing means is detected. When the carriage of the recording medium to the recording and reproducing means is detected, it is determined that loading of the recording medium is completed, without waiting for the completion of the preparing operation to be performed by the recording and reproducing means after the recording medium is loaded. The conventional useless waiting time in the carriage of the recording medium can be therefore eliminated. This contributes to an improvement in the processing efficiency of the recording medium library device. In the recording medium library device or the method of notifying completion of loading of a recording medium therefor, the request to load the recording medium housed in the housing section in the recording medium housing means to the recording and reproducing means is sent to the carrying means, and the carriage of the recording medium to the recording and reproducing means is detected. When the carriage of the recording medium to the recording and reproducing means is detected, it is determined that the loading of the recording medium is completed, without waiting for completion of the preparing operation executed by the recording and reproducing means after the recording medium is loaded and a notification of loading completion of the recording medium is sent to the client. The client can therefore send the next request to the recording medium library device without waiting for completion of the preparing operation to be executed by the recording and reproducing means. The waiting time which is conventionally useless to the client can be therefore eliminated and the processing efficiency of the whole system including the client and the recording medium library device is improved. In the recording medium library device, after the recording medium is loaded, the recording and reproducing means performs a preparing operation of reading information for retrieving data recorded on the recording medium. In addition to the effect above, the processing speed with which the data on the recording medium is accessed is increased and the processing efficiency of the recording medium library device as a whole is further improved.

According to still another recording medium library device of the invention or a cleaning method of the recording medium library device, the cleaning medium is automatically carried from the housing section of the recording medium housing means to the recording and reproducing means at a preset timing. The recording and reproducing means is cleaned by the cleaning medium, and after that, the cleaning medium is carried to the housing section in the recording medium housing means. The state of the cleaning medium is monitored and it is determined whether the cleaning medium has been used to the limit or not. Consequently, even when the recording and reproducing means is automatically cleaned by the cleaning medium, an inconvenience such that a cleaning medium which has been used to the limit and is in an unusable state is used again for cleaning and the cleaning is not properly performed can be avoided. That is, use of the cleaning medium can be properly managed and cleaning of the recording medium library device can be ensured. In this case, when the number of times the cleaning medium is used is monitored and it is determined that the cleaning medium has been used to its limit when the number of times reaches a predetermined number, it is not necessary to monitor the presence or absence of an area which is actually usable in the cleaning medium. Since the limit of use can be determined simply by monitoring the number of times, use of the cleaning medium is easily managed. The presence or absence of the usable area of the cleaning medium is monitored and it is determined that the cleaning medium has been used to the limit when there is no usable area. Thus, for example, when the cleaning is performed by using a cleaning medium which has been already used to a certain degree, even if the use history (number of times) is unclear, the limit of use can be determined before the cleaning medium becomes unusable. Even when the cleaning medium with unclear use history is used, the use of the cleaning medium can be properly managed, and the cleaning of the recording medium library device can be ensured. Further, the ejecting unit for ejecting the recording medium and the cleaning medium to the outside is provided. When the cleaning medium has been used to the limit, the cleaning medium is carried to the ejecting unit by the carrying means. The unnecessary cleaning medium which becomes unusable can be certainly ejected to the outside of the apparatus and the trouble of taking out the unnecessary cleaning medium by the user himself/herself is eliminated. By outputting information to eject the cleaning medium when the cleaning medium has been used to its limit, the user can immediately know occurrence of an unnecessary cleaning medium which becomes unusable. Thus, in the recording medium library device having no recording medium ejecting mechanism, the possibility that the unnecessary cleaning medium continuously occupies a part of the housing shelf or is used again can be avoided.

Obviously many modifications and variations of the present invention are possible in the light of the above teachings. It is therefore to be understood that within the scope of the appended claims that invention may be practiced otherwise than as specifically described.

What is claimed is:

1. A recording medium library device comprising:

recording and reproducing means for performing at least either recording or reproduction of information by using a removable recording medium;

recording medium housing means having a plurality of housing sections, each capable of housing the recording medium;

carrying means for carrying the recording medium between any one of the housing sections in the recording medium housing means and the recording and reproducing means; and control means for controlling the carrying means and the recording and reproducing means, wherein the control means has an automatic cleaning function of controlling the carrying means and the recording and reproducing means to automatically carry, at a preset timing, a cleaning medium used for cleaning the recording and reproducing means from the housing section of the recording medium housing means to the recording and reproducing means, to allow the cleaning medium to clean the recording and reproducing means, and then to carry the cleaning medium to the housing section of the recording medium housing means, and a function of monitoring a state of use of the cleaning medium and determining whether the cleaning medium has been used to its limit or not;

wherein the control means monitors the presence or absence of a usable area of the cleaning medium and determines that the cleaning medium has been used to its limit when there is no usable area.

2. A recording medium library device according to claim 1, further comprising an ejecting unit for ejecting the recording medium and the cleaning medium to the outside, wherein, when it is determined that the cleaning medium has been used to its limit, the control means controls the carrying means to carry the cleaning medium to the ejecting unit.

3. A recording medium library device according to claim 1, wherein, when it is determined that the cleaning medium has been used to its limit, the control means outputs information to eject the cleaning medium.

4. A cleaning method of a recording medium library device for cleaning recording and reproducing means in a recording medium library device which comprises: recording and reproducing means for performing at least either recording or reproduction of information by using a removable recording medium; recording medium housing means having a plurality of housing sections, each capable of housing the recording medium; carrying means for carrying the recording medium between any one of the housing sections in the recording medium housing means and the recording and reproducing means; and control means for controlling the carrying means and the recording and reproducing means, wherein the control means controls the carrying means and the recording and reproducing means to automatically carry, at a preset timing, a cleaning medium used for cleaning the recording and reproducing means from the housing section in the recording medium housing means to the recording and reproducing means, to allow the cleaning medium to clean the recording and reproducing means, after that, to carry the cleaning medium to the housing section in the recording medium housing means, while monitoring the state of use of the cleaning medium and determining whether the cleaning medium has been used to its limit or not; and wherein the presence or absence of a usable area of the cleaning medium is monitored as a state of use of the cleaning medium and, when there is no usable area, it is determined that the cleaning medium has.

5. A cleaning method of a recording medium library device according to claim 4, wherein the recording medium library device further comprises an ejecting unit for ejecting the recording medium and the cleaning medium to the outside, and when it is determined that the cleaning medium has been used to its limit, the carrying means is controlled to carry the cleaning medium to the ejecting unit.

6. A cleaning method of a recording medium library device according to claim 4, wherein, when the cleaning medium has been used to its limit, information is outputted to eject the cleaning medium.

* * * * *